(12) United States Patent
Yao et al.

(10) Patent No.: US 12,143,987 B2
(45) Date of Patent: Nov. 12, 2024

(54) BLIND RETRANSMISSION SCHEMES

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Haijing Hu, Los Gatos, CA (US); Haitong Sun, Cupertino, CA (US); Hong He, San Jose, CA (US); Huaning Niu, San Jose, CA (US); Oghenekome Oteri, San Diego, CA (US); Sarma V. Vangala, Campbell, CA (US); Sigen Ye, Whitehouse Station, NJ (US); Wei Zeng, Saratoga, CA (US); Weidong Yang, San Diego, CA (US); Yushu Zhang, Beijing (CN); Zhu Ji, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/440,886

(22) PCT Filed: Oct. 23, 2020

(86) PCT No.: PCT/CN2020/123243
§ 371 (c)(1),
(2) Date: Sep. 20, 2021

(87) PCT Pub. No.: WO2022/082726
PCT Pub. Date: Apr. 28, 2022

(65) Prior Publication Data
US 2023/0247630 A1 Aug. 3, 2023

(51) Int. Cl.
*H04W 72/1273* (2023.01)
*H04L 1/00* (2006.01)
(Continued)

(52) U.S. Cl.
CPC ....... *H04W 72/1273* (2013.01); *H04L 1/0038* (2013.01); *H04L 1/1812* (2013.01); *H04W 72/1268* (2013.01); *H04W 72/20* (2023.01)

(58) Field of Classification Search
CPC ......... H04W 72/1273; H04W 72/1268; H04W 72/20; H04W 72/23; H04L 1/0038;
(Continued)

(56) References Cited

U.S. PATENT DOCUMENTS

| 10,750,488 B2 | 8/2020 | He |
| 2019/0052406 A1* | 2/2019 | Yang ..................... H04L 1/1819 |

(Continued)

FOREIGN PATENT DOCUMENTS

| CN | 110024464 A | 7/2019 |
| WO | 2017061922 A1 | 4/2017 |

OTHER PUBLICATIONS

International Search Report Dated May 14, 2021 for International Application PCT/CN2020/123243.
(Continued)

*Primary Examiner* — Rina C Pancholi
(74) *Attorney, Agent, or Firm* — Eschweiler & Potashnik, LLC

(57) ABSTRACT

Systems, methods, and circuitries are provided for supporting blind retransmission. In one example, a method includes processing control information that indicates resources for communication of a physical downlink shared channel or a physical uplink shared channel (PDSCH/PUSCH) transmission and timing information for a retransmission of the PDSCH/PUSCH. The method includes configuring operation to: receive the PDSCH/PUSCH transmission based on the resources; and determine that a subsequent PDSCH/PUSCH received at a subsequent time corresponds to the retransmission of the PDSCH/PUSCH when the subsequent
(Continued)

time coincides with the indicated timing information for the retransmission and, in response combine the PDSCH/PUSCH with the retransmission in a HARQ buffer for decoding purposes.

17 Claims, 11 Drawing Sheets

(51) Int. Cl.
*H04L 1/1812* (2023.01)
*H04W 72/1268* (2023.01)
*H04W 72/20* (2023.01)

(58) Field of Classification Search
CPC ... H04L 1/1812; H04L 1/1819; H04L 1/1825; H04L 1/1887; H04L 1/08
See application file for complete search history.

(56) References Cited

U.S. PATENT DOCUMENTS

2020/0014495 A1* 1/2020 Niu .................. H04W 72/23
2022/0294569 A1* 9/2022 Matsuda ............ H04L 1/1812
2022/0368465 A1* 11/2022 Wong ................ H04L 1/1812
2023/0231660 A1* 7/2023 Wu ................... H04L 1/1854
714/748

OTHER PUBLICATIONS

International Written Opinion Dated May 14, 2021 for International Application PCT/CN2020/123243.
Sony; "Feedbacks for Improving URLLC Reliability"; 3GPP TSG RAN WG1 Meeting #88; R1-1703123; Feb. 17, 2017.
Thales; "Solutions for NR to Support Non-Terrestrial Networks (NTN)"; 3GPP TSG RAN Meeting #88e; Jun. 29-Jul. 3, 2020; RP-201256.
European Supplemental Search Report Dated May 6, 2024 for International Application 20958308.7.
Panasonic; "HARQ and blind retransmission for NTN"; 3GPP TSG RAN WG1 #98; R1-1908819; Aug. 16, 2019.
Sony; Feedbacks for improving URLLC reliability; 3GPP TSG RAN WG1 Meeting #88; R1-1703123; Feb. 13, 2017.
Sony; Feedbacks for improving URLLC reliability; Discussion / decision; 8.1.3.4.4; 3GPP TSG RAN WG1 Meeting #88; R1-1703123; Athens, Greece Feb. 13-17, 2017.

* cited by examiner

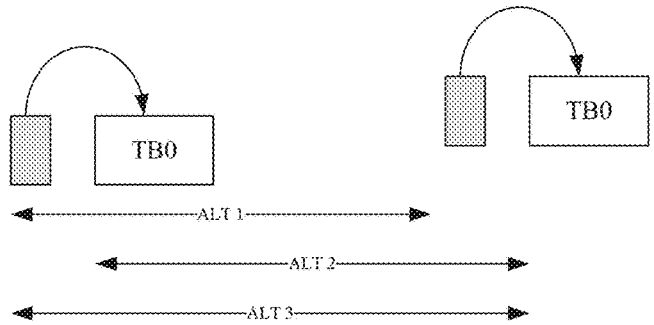
*FIG. 3A*
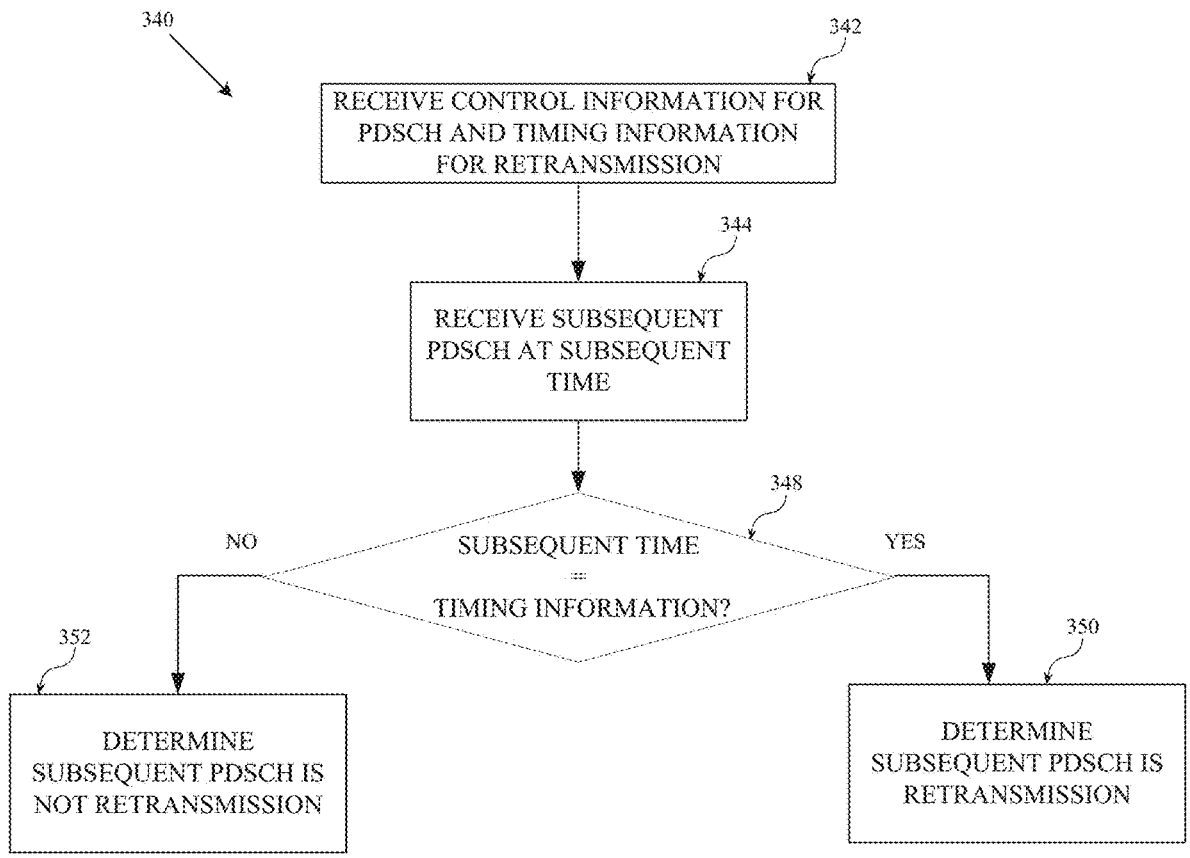
*FIG. 3B*
*FIG. 3C*

BLIND RETRANSMISSION SCHEMES

REFERENCE TO RELATED APPLICATIONS

This application is a National Phase entry application of International Patent Application No. PCT/CN2020/123243 filed Oct. 23, 2020, entitled "BLIND RETRANSMISSION SCHEMES", the contents of which are herein incorporated by reference in their entirety.

BACKGROUND

Some wireless communication networks, such as non-terrestrial networks may be susceptible to high-latency links, which complicates many aspects of communication.

BRIEF DESCRIPTION OF THE DRAWINGS

Some examples of circuits, apparatuses and/or methods will be described in the following by way of example only. In this context, reference will be made to the accompanying figures.

FIG. 3A is a block diagram of three alternative schemes for identifying a timing of a subsequent blind transmission, in accordance with various aspects disclosed.

FIG. 3B is a block diagram illustrating an exemplary configuration for identifying a timing of a subsequent blind transmission, in accordance with various aspects disclosed.

FIG. 3C is a flow diagram of an exemplary method for processing a physical downlink shared channel PDSCH based on indicated timing information for a subsequent blind retransmission, in accordance with various aspects disclosed.

DETAILED DESCRIPTION

Figure 1A:
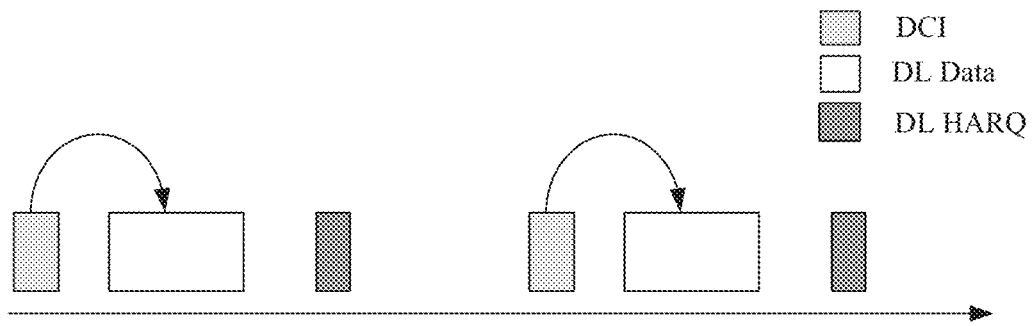
FIGS. 1A-1D are block diagrams outlining four different types of retransmission schemes.

The present disclosure is described with reference to the attached figures. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

As the number of mobile devices connected to wireless networks and the demand for mobile data traffic continue to increase, changes are made to system requirements and architectures to meet current and anticipated burgeoning demand. For example, wireless communication networks such as the 5G new radio (NR) systems may need to be deployed using satellites as parts of a non-terrestrial network (NTN). In one deployment scenario of a NTN, a satellite referred to as a transparent satellite may act as a relay station to link user devices with a ground-based base station and the 5G core network by implementing a transparent payload. In another deployment scenario, a satellite referred to as a regenerative satellite may have onboard processing capability to perform the functions of a base station by implementing a regenerative payload between the user devices and the ground-based 5G core network.

Due to the wide coverage area of the satellites and the long distances between the satellites and the user devices on the ground, the difference in propagation delays between two user devices within the beam footprint is greater than that encountered in strictly terrestrial networks. For example, for a NTN deploying satellites in a geosynchronous earth orbit (GEO), the maximum differential delay between points at a nadir and edge of the coverage may be 10.3 ms. For a NTN deploying satellites in a low earth orbit (LEO), the maximum differential delay may be 3.12 ms and 3.18 ms for 600 km and 900 km altitude, respectively.

The large propagation delay of a user device and the large difference in propagation delays between user devices in the beam footprint may cause problems with the use of hybrid automatic repeat request (HARQ) feedback. To cope with the larger propagation delays, it may be advantageous for user equipment (UE) devices to support an increased number of HARQ processes. However, this increased number of HARQ processes introduces design challenges around communicating HARQ process identifiers and storage/processing capabilities of UE devices. The potential loss in link reliability due to long distances and moving base stations may be compensated by performing proactive aggregated retransmission or blind retransmission. Further, in many circumstances it may be beneficial to simply disable HARQ feedback, meaning that the use of compensating techniques such as aggregated or blind retransmission may become more prevalent.

Disclosed herein are systems, circuitries, and techniques for supporting the signalling and performance of retransmission techniques in the presence of high-latency links or large propagation links when HARQ feedback may be disabled.

As used herein "retransmission" refers to retransmitting a same physical downlink shared channel (PDSCH) or physical uplink shared channel (PUSCH) data (and associated error coding bits) (or a redundancy version of the same transport block) at least one additional time after the initial transmission of the transport block. This retransmission may be proactive, meaning that the retransmission may be performed independent of received HARQ feedback. Retransmission, as compared to a new transmission of data, may be indicated, for example, by a same HARQ process number or a new data indicator (NDI) bit being un-toggled. In some examples, the number of times a PDSCH/PUSCH is to be proactively retransmitted is referred to as a repetition number, which may be indicated by uplink (UL) or downlink (DL) downlink control information (DCI), which is referred to in a generic sense herein as "control information." In some examples, other signalling methods than DCI may be used in place of DCI to communicate the described control information. The terms "retransmission" and "repetition" may be used interchangeably in this description. Unless otherwise noted, it is to be assumed that example downlink communication for techniques can also be applied in uplink communication.

Figure 1B:
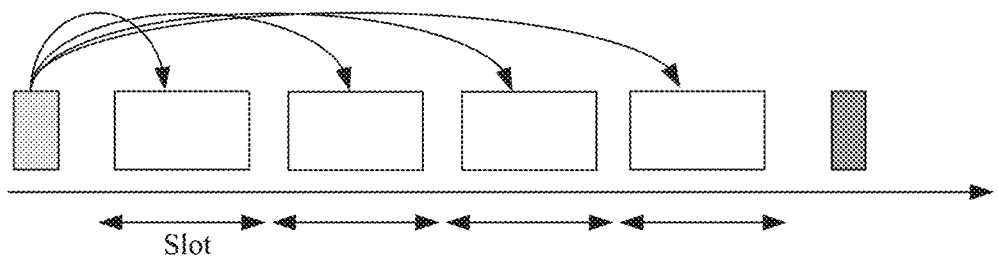

FIGS. 1A-1D illustrate several different retransmission schemes. FIG. 1A illustrates legacy retransmission. It can be see that each transmission of DL data (including a first retransmission of the DL data) is indicated by a corresponding and separately acknowledged by DL HARQ feedback. FIG. 1B illustrates legacy aggregated retransmission with HARQ feedback. A single DCI is used to schedule transmission and several retransmissions of the same DL data. A single HARQ feedback communication (e.g., bit) is used to acknowledge (ACK) or not acknowledge (NACK) successful receipt of the DL data. The retransmissions occur in contiguous slots using the same frequency resources. In some examples, the slots are arranged into slot groups of contiguous slots, with each slot group being associated with a set of HARQ process numbers.

Figure 1C:
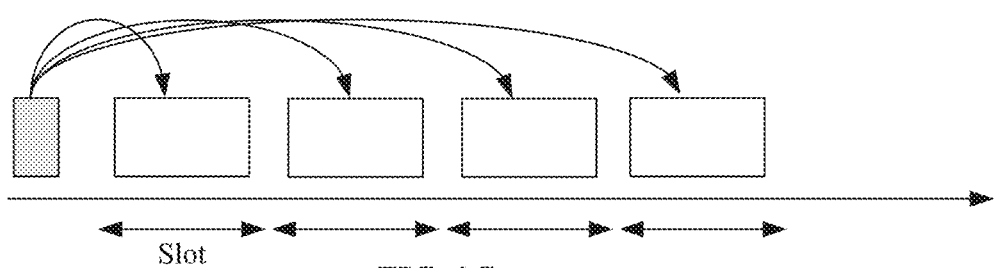
Figure 1D:
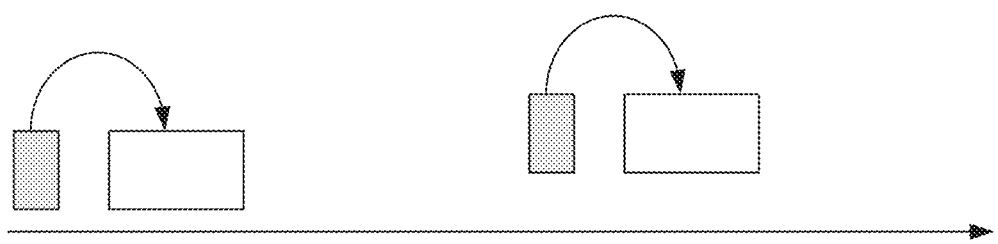

In some high latency situations, HARQ feedback may be disabled. FIG. 1C illustrates aggregated retransmission without HARQ feedback. A single DCI is used to schedule transmission and several retransmissions of the same DL data. Another type of retransmission scheme that may be beneficial when HARQ feedback is disabled is blind retransmission, which is illustrated in FIG. 1D. Blind retransmission is proactive retransmission of the same PDSCH/PUSCH on resources that may be unrelated to prior transmissions because the blind retransmission is signaled by its own DCI. The blind retransmission approach provides the advantage of time and/or frequency diversity over the aggregated retransmission techniques illustrated in FIGS. 1B and 1C, in which the same frequency resources and consecutive slots are used for retransmission.

Disclosed herein are systems, methods, and circuitries for supporting blind retransmissions with and without HARQ feedback.

Figure 2:
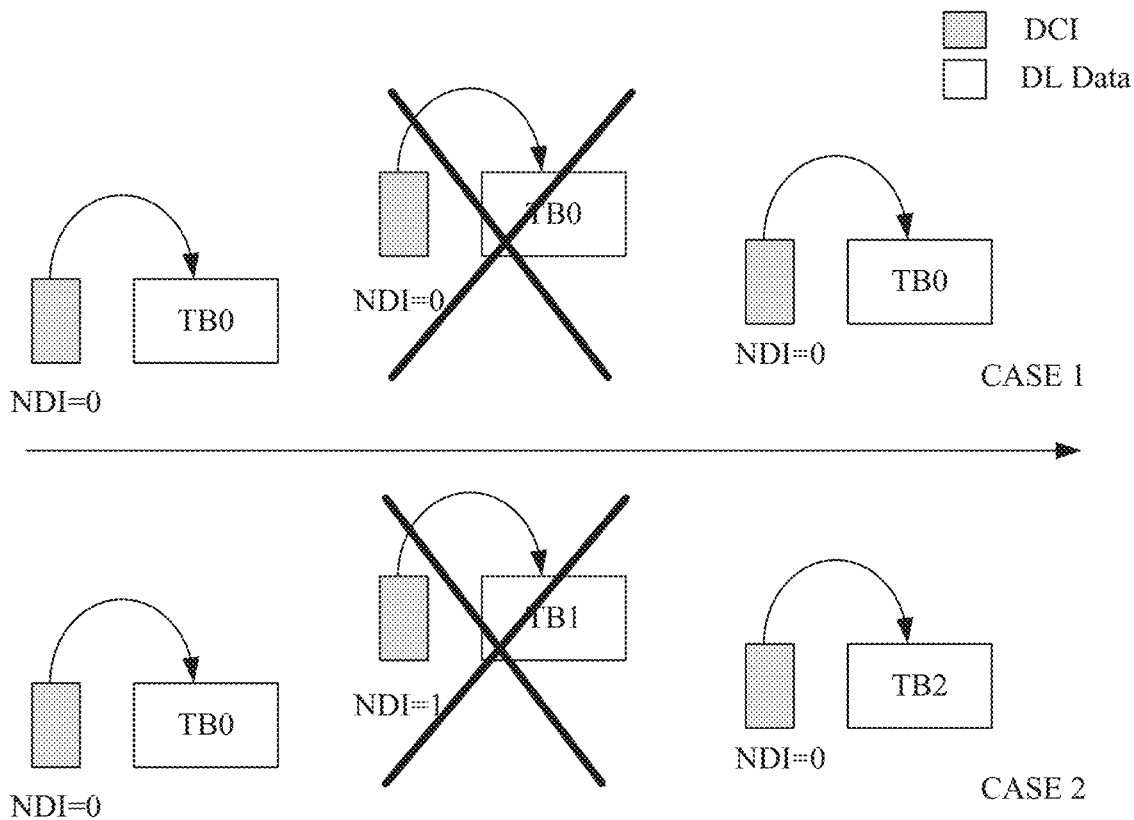
FIG. 2 is a block diagrams illustrating two sequences of transmissions in which a middle transmission is not received.

FIG. 2 illustrates a timing diagram of two different sequences of three transmissions without HARQ feedback. In Case 1 (the top sequence), three blind retransmissions are transmitting the same DL data (the illustrated concept applies in uplink as well). To indicate that the three blind retransmissions are transmitting the same data, the DCI that schedules the second two PDSCH has a new data indicator (NDI) bit un-toggled. A device receiving the three blind retransmissions of Case 1 should combine the PDSCH for decoding purposes to improve the likelihood of successful decoding.

In Case 2 (the bottom sequence), the second and third blind retransmissions are transmitting different DL data. This is evidenced by the NDI bit being toggled in the DCI for the second blind retransmission and again for the third blind retransmission. A device receiving the three blind retransmissions of Case 2 should not combine the first PDSCH with the other two PDSCH for decoding purposes.

In the situation where the second blind retransmission is not received so that only the first and third blind retransmissions are received, a question at the receiver arises as to whether to combine the PDSCH of the first and third blind retransmission for decoding purposes.

Figure 3:
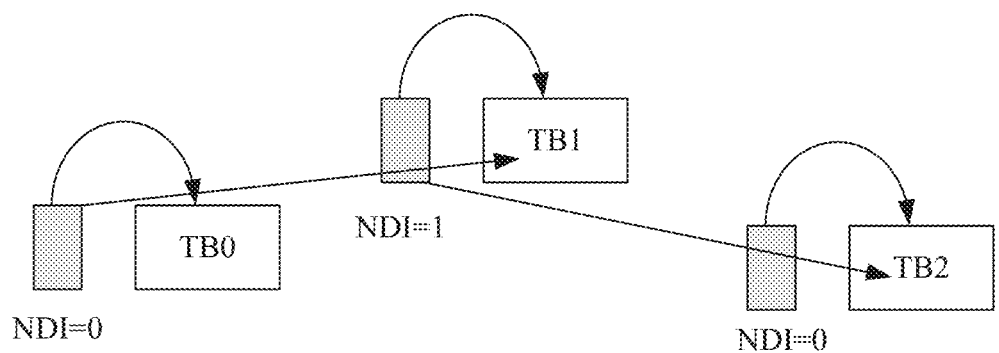
FIG. 3 is a block diagram illustrating an exemplary technique for identifying a timing of a subsequent blind transmission, in accordance with various aspects disclosed.

FIG. 3 is a block diagram illustrating an exemplary "chaining" technique for reducing the likelihood that a blind retransmission of a received PDSCH/PUSCH is combined with a prior received blind retransmission of a different PDSCH/PUSCH. In this scheme, DCI indicating a blind retransmission also includes timing information for a subsequent blind retransmission. In this manner, when a receiver receives PDSCH/PUSCH with the NDI bit un-toggled, the timing of the PDSCH/PUSCH may be checked against timing information received in a prior blind retransmission to determine if the instant PDSCH/PUSCH should be combined with the prior blind retransmission. It can be seen that the chaining technique would prevent the combining of the third blind retransmissions with the first blind retransmission, preventing a possible erroneous combination of different data.

The timing information for the subsequent blind retransmission may be indicated by a time gap carried in control information, such as DCI, for a prior blind retransmission. The time gap may be, for example, in terms of slots. FIG. 3A illustrates three alternative schemes for indicating the timing information or time gap for a subsequent blind retransmission. In alternative 1, the time gap indicates the time between the timing of the first DCI and the timing of second DCI for the subsequent blind retransmission. In alternative 2, the time gap indicates the time between the timing of the first PDSCH/PUSCH and the timing of the second PDSCH/PUSCH. In the third alternative, the time gap indicates the time between the timing of first DCI and the timing of second PDSCH/PUSCH.

The are several means for communicating the time gap between an instant blind retransmission and a subsequent blind retransmission. For example, a DCI field used to communicate HARQ feedback related information may be repurposed and reinterpreted, when HARQ feedback is disabled, to communicate the time gap. The PDSCH-to-HARQ feedback timing field in DCI format 1_0/1_1/1_2 may be used to carry the time gap information. Alternatively, a new DCI field for signaling the time gap may be included in one or more DCI formats. The time gap may be directly indicated in DCI (e.g., as a number of slots). In other examples, as illustrated in FIG. 3B, a time gap index is used in DCI to communicate an index value mapped in a separately configured table. This approach allows for communication of time gap values that cannot be communicated in the number of bits allocated in DCI for the time gap value. A time gap value of 0 may be used to indicate that no further blind retransmissions are scheduled. In some examples, timing information for more than one subsequent bind retransmission is included in the same control information.

FIG. 3C is a flow diagram outlining an exemplary method 340 for processing a PDSCH. At 342, control information scheduling PDSCH is received that includes timing information for a retransmission. At 344 a subsequent PDSCH is received at a subsequent time. At 348, a determination is made as to whether the subsequent time is the same as the received timing information. If so, at 350 it is determined that the PDSCH is the retransmission. If not, at 352 it is determined that the PDSCH is not the retransmission. An analogous method for uplink or PUSCH blind retransmission is not included here for the sake of brevity.

Figure 3D:
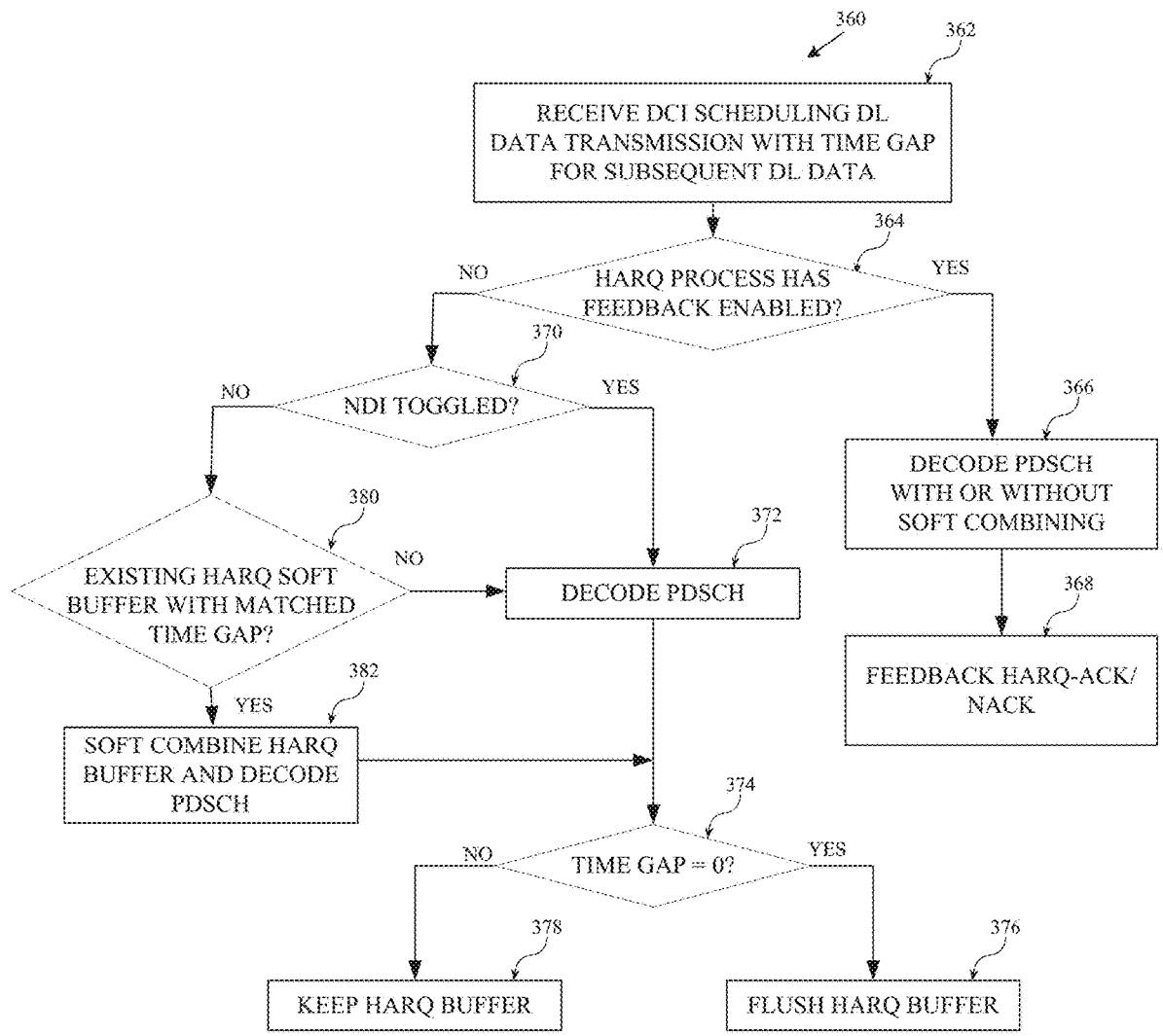
FIG. 3D is a flow diagram of an exemplary method for processing a physical downlink shared channel (PDSCH) based on indicated timing information for a subsequent blind retransmission, in accordance with various aspects disclosed.

FIG. 3D is a flow diagram outlining an exemplary method 360 for processing PDSCH blind retransmissions. At 362 a DCI scheduling downlink data transmission is received that also indicates a time gap for a subsequent DL data transmission. At 364 a determination is made as to whether the DCI indicates a HARQ process that corresponds to enabled HARQ feedback. If HARQ feedback is enabled, at 366 the received PDSCH is decoded with or without soft decoding and at 368 HARQ-ACK or NACK is provided as appropriate.

If HARQ feedback is not enabled, at 370 a determination is made as to whether the NDI bit is toggled. If the NDI bit is toggled, indicating that the received PDSCH is new data, at 372 the PDSCH is decoded. If the NDI bit is not toggled, at 380 a determination is made as to whether an existing HARQ soft buffer has a matched time gap with respect to the received PDSCH. If no existing HARQ soft buffer has a matched time gap, it is presumed that the PDSCH is not a retransmission and the PDSCH is decoded at 372. If there is an existing HARQ soft buffer with a matching time gap, at 382 the PDSCH is soft combined with the HARQ buffer and the result is decoded.

At 374, a determination is made as to whether the time gap specified in the control information is 0. If so, there are not further blind retransmissions scheduled and the HARQ buffer is flushed at 376. If not, there is another blind retransmission scheduled an the HARQ buffer is kept (i.e., not flushed) at 378. An analogous method for uplink or PUSCH blind retransmission is not included here for the sake of brevity.

In some examples, the DCI indicates both the time and frequency resources of the subsequent blind retransmission. The starting frequency domain resource of the current PDSCH/PUSCH may be jointly encoded in the DCI with the starting frequency domain resource of the subsequent blind retransmission, as well as with the frequency domain size of the retransmission. This modification may be applied to any of the above timing information only schemes. In one example, the NDI includes more than one bit.

Figure 4:
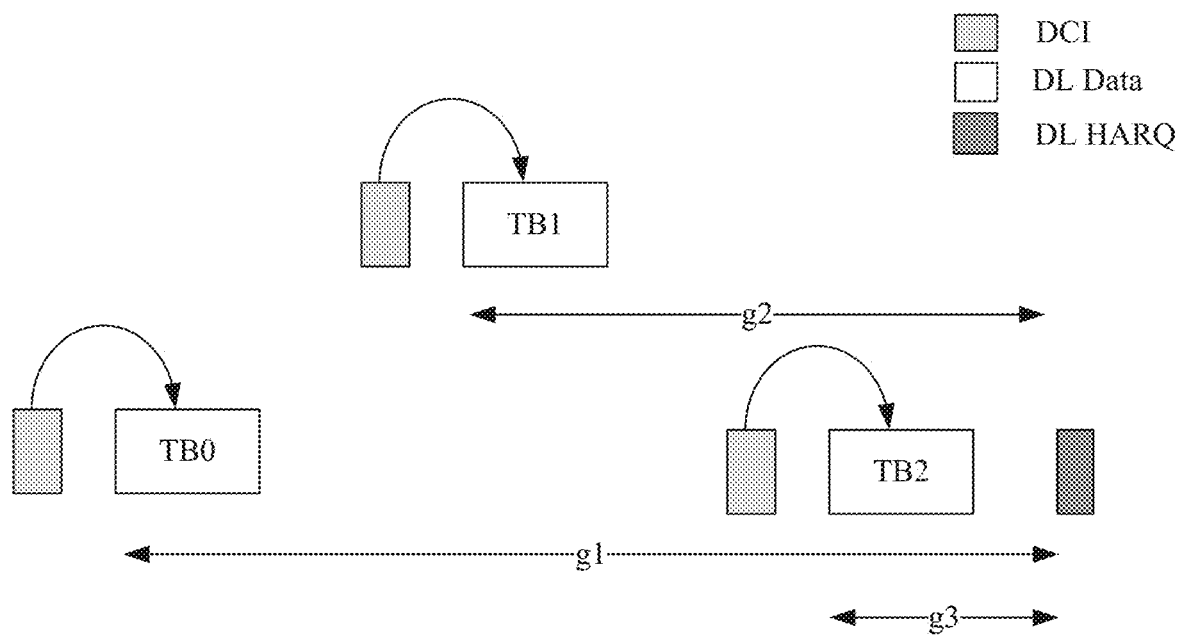
FIG. 4 illustrates alternative exemplary schemes for providing hybrid automatic repeat request (HARQ) feedback for blind retransmissions, in accordance with various aspects disclosed.

FIG. 4 illustrates several exemplary schemes for providing HARQ feedback for a sequence of blind retransmissions. The HARQ feedback instance that occurs after the blind retransmissions at time gaps g1, g2, and g3, respectively communicates a final decoding result of the blind retransmissions (which may include soft combining). In a first example for a semi-static codebook, illustrated in the top row of the table in FIG. 4, the final decoding result (ACK or NACK) is reported on the bit (e.g., the bit for g1, g2, and g3) for every blind retransmission. In a second example for a semi-static codebook, illustrated in the second row of the table in FIG. 4, a NACK is reported in the bit for every blind retransmission prior to the final blind retransmission (e.g., the bit for g1 and g2) and the final decoding result (ACK or NACK) is reported on the bit for the final blind retransmission (e.g., the bit for g3). The final blind retransmission may be detected as such by DCI that indicates a time gap of 0. In a third example for a semi-static codebook, illustrated in the third row of the table in FIG. 4, the final decoding result may be reported in a single bit associated with the final blind retransmission (e.g., the bit for g3).

For a dynamic codebook, the intermediate decoding result based on the actual decoding status may be reported in the bit for each blind retransmission. In another example for a dynamic codebook, the final decoding result (ACK or NACK) is reported on the bit (e.g., the bit for g1, g2, and g3) for every blind retransmission. The counter downlink assignment index (DAI) for the blind retransmissions may be ignored. These approaches are applicable to HARQ processes with enabled or disabled HARQ feedback.

Figure 4A:
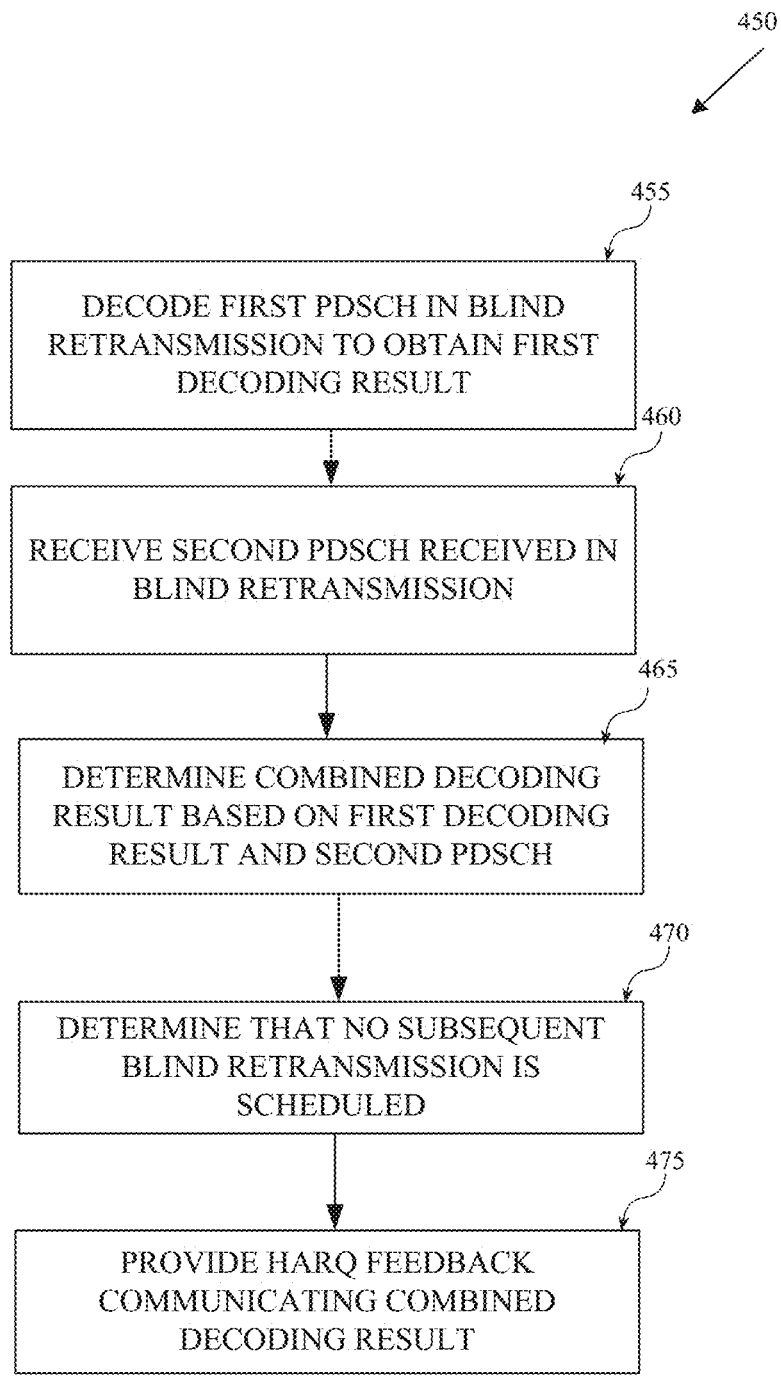
FIG. 4A is a flow diagram outlining an exemplary method for providing hybrid automatic repeat request (HARQ) feedback for blind retransmissions, in accordance with various aspects disclosed.

FIG. 4A is a flow diagram outlining a method 450 for providing HARQ feedback for blind retransmissions. The method includes, at 455, decoding a first PDSCH in a blind retransmission to obtain a first decoding result. The method includes, at 460, receiving a second PDSCH in a second blind retransmission. At 465 a combined decoding result is determined based on the first decoding result and the second PDSCH. In one example, at 465 the second PDSCH is decoded to obtain a second decoding result and the first and second decoding results are soft combined to obtain the combined decoding result. In another example, at 465 the second PDSCH may be soft combined with the first decoding result and the resulting combination is decoded to obtain the combined decoding result. The method includes, at 470, determining that no subsequent blind retransmission is scheduled. At 475, HARQ feedback is provided that communicates the combined decoding result (e.g., the final decoding result).

Figure 5:
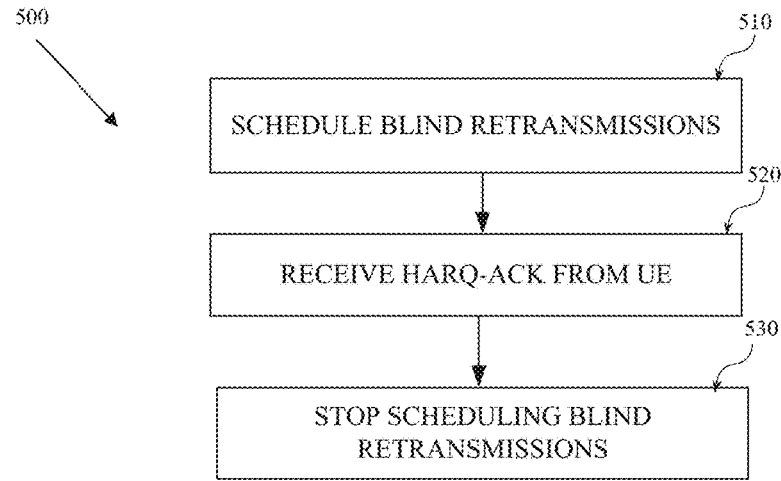
FIG. 5 is a flow diagram outlining an exemplary method for scheduling blind retransmissions, in accordance with various aspects disclosed.

FIG. 5 is a flow diagram outlining a method 500 for a base station to schedule blind retransmissions with HARQ feedback. At 510, the base station schedules blind retransmissions. At 520, HARQ-ACK feedback is received. At 530, in response, the base station stops scheduling blind retransmissions.

Figure 6:
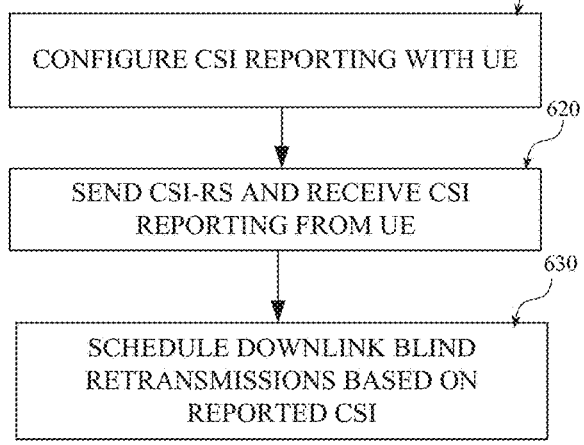
FIG. 6 is a flow diagram outlining an exemplary method for scheduling blind retransmissions based on channel conditions, in accordance with various aspects disclosed.
Figure 7:
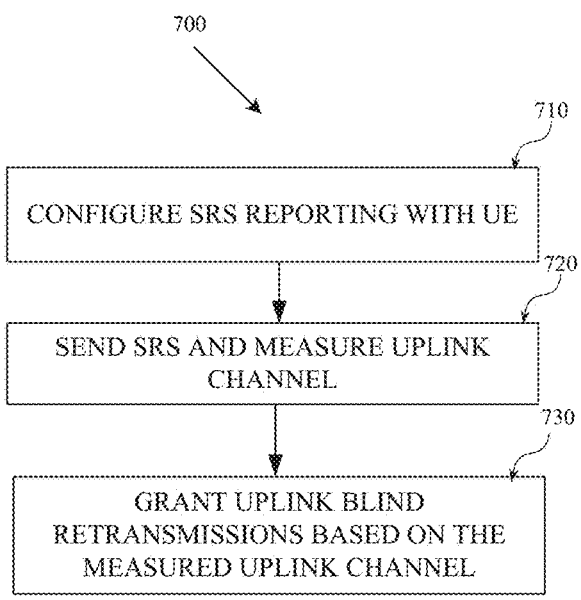
FIG. 7 is a flow diagram outlining an exemplary method for scheduling blind retransmissions based on channel conditions, in accordance with various aspects disclosed.

FIGS. 6 and 7 are flow diagrams outlining exemplary methods 600, 700, respectively, for scheduling blind retransmissions based on channel conditions. FIG. 6 outlines an exemplary method 600 for scheduling downlink blind retransmissions based on downlink channel conditions. At 610, channel state information (CSI) reporting is configured with a UE. At 620, CSI reference signals (RS) are transmitted to the UE and CSI reporting is received from the UE. At 630, downlink blind retransmissions are scheduled based on the reported CSI. For example, whether or not to apply blind retransmissions, a number of blind retransmissions, a time gap between blind retransmissions, and a redundancy version sequence for the blind retransmissions may be determined based on the downlink channel conditions.

FIG. 7 outlines an exemplary method 700 for scheduling uplink blind retransmissions based on downlink channel conditions. At 610, sounding reference signal (SRS) reporting is configured with a UE. At 620, SRS are received from the UE and measurements of the uplink channel are made based on the SRS. At 630, uplink blind retransmissions are granted based on the measured uplink channel. For example, whether or not to apply blind retransmissions, a number of blind retransmissions, a time gap between blind retransmissions, and a redundancy version sequence for the blind retransmissions may be determined based on the uplink channel conditions.

Figure 8A:
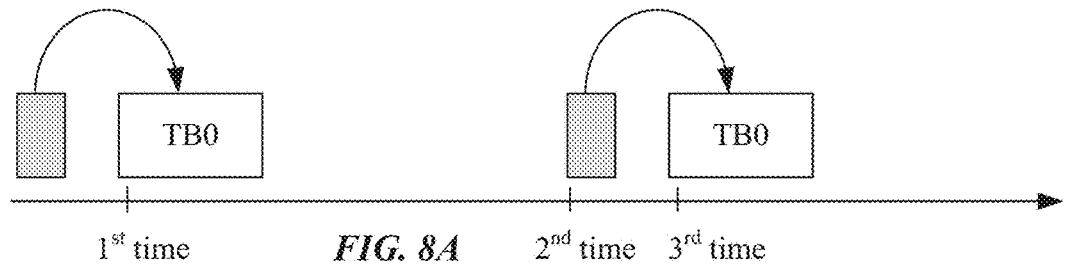
FIGS. 8A-8B are timing diagrams illustrating a timing between downlink control information (DCI) indicating uplink blind retransmissions, in accordance with various aspects disclosed.
Figure 8B:
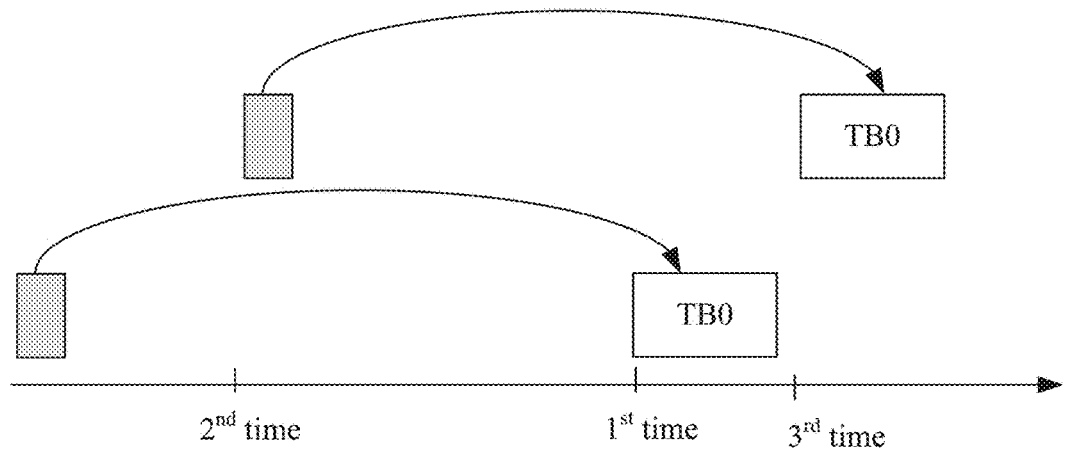

FIGS. 8A and 8B illustrate exemplary uplink blind retransmissions with different timing between the DCI and data. In the scenarios of both 8A and 8B first DCI indicates that a first retransmission will occur at a first time. A second DCI is received at a second time that indicates that a second retransmission will occur at a third time (e.g., by indicating a same HARQ process number as the first DCI and/or including an un-toggled NDI bit). In legacy systems, as shown in FIG. 8A, the UL DCI for a second retransmission should occur after the first retransmission. An error event may occur if, as illustrated in FIG. 8B, the UL DCI for the subsequent retransmission (e.g., the second time) occurs prior to the prior retransmission (e.g., the first time).

Figure 8C:
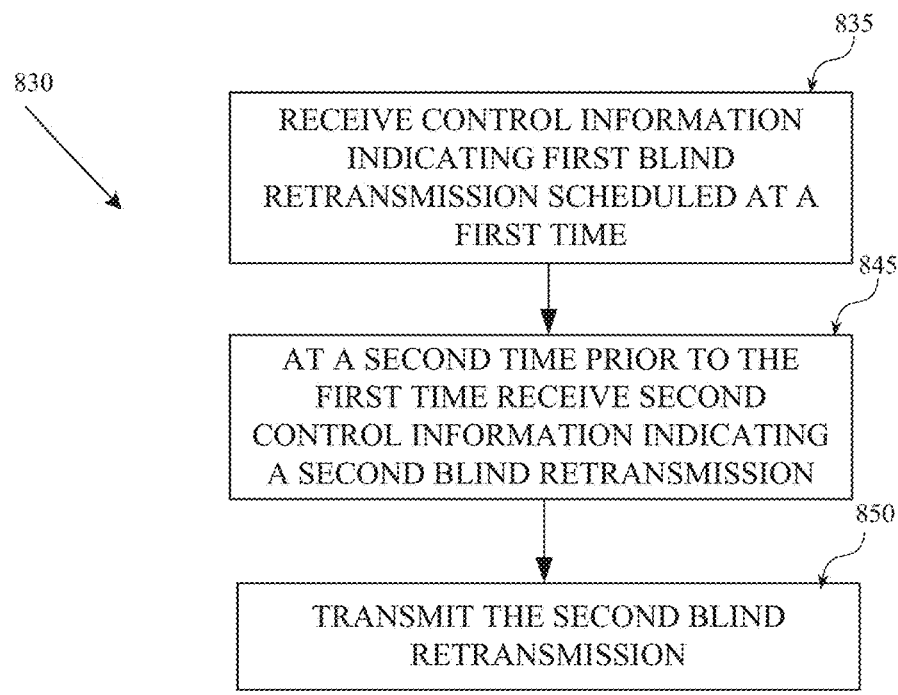
FIG. 8C is a flow diagram outlining a method for processing DCI received prior to communication of PUSCH scheduled by a prior DCI, in accordance with various aspects disclosed.

To support the use of blind retransmission, a UE may be configured to perform the exemplary method 830 of FIG. 8C. In the method, at 835, control information is received indicating a first blind retransmission scheduled at a first time. At 845, at a second time, prior to the first time, second control information is received indicating a second blind retransmission. At 850, even though the second control information is received prior to transmitting the first blind retransmission, an error event is not detected and the second blind retransmission is transmitted.

In one example, the UL DCI includes a flag to indicate that blind retransmission is supported and, in response, the UE receiving second DCI will perform the method 830. In another example, the UE receiving second UL DCI will perform the method 830 when the time gap between the second blind transmission and the first transmission correlates to a time gap received in the first UL DCI.

Figure 8D:
FIGS. 8D-8E are timing diagrams illustrating a timing between downlink control information (DCI) indicating downlink blind retransmissions, in accordance with various aspects disclosed.
Figure 8D:
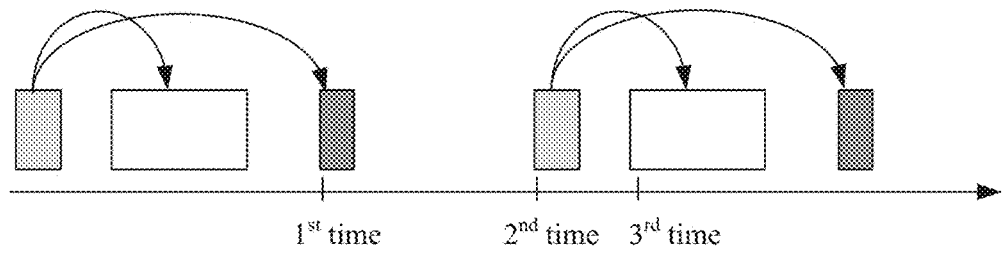
Figure 8E:
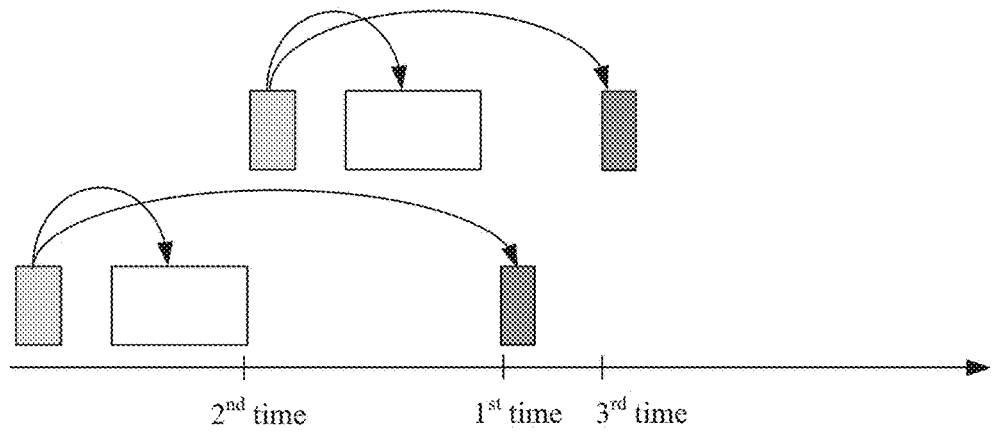

FIGS. 8D and 8E illustrate exemplary downlink blind retransmissions with different timing between the DCI and HARQ feedback timing. In the scenarios of both 8D and 8E first DL DCI indicates that a first retransmission will occur having a HARQ feedback to occur at a first time. A second DL DCI is received at a second time that indicates that a second retransmission will occur at a third time (e.g., by indicating a same HARQ process number as the first DCI and/or including an un-toggled NDI bit). In legacy systems, as shown in FIG. 8D, the DL DCI for a second retransmission should occur after the HARQ feedback is scheduled for the first retransmission. An error event may occur if, as illustrated in FIG. 8F, the DL DCI for the subsequent retransmission (e.g., the second time) occurs prior to the HARQ feedback for the first retransmission (e.g., the first time).

Figure 8F:
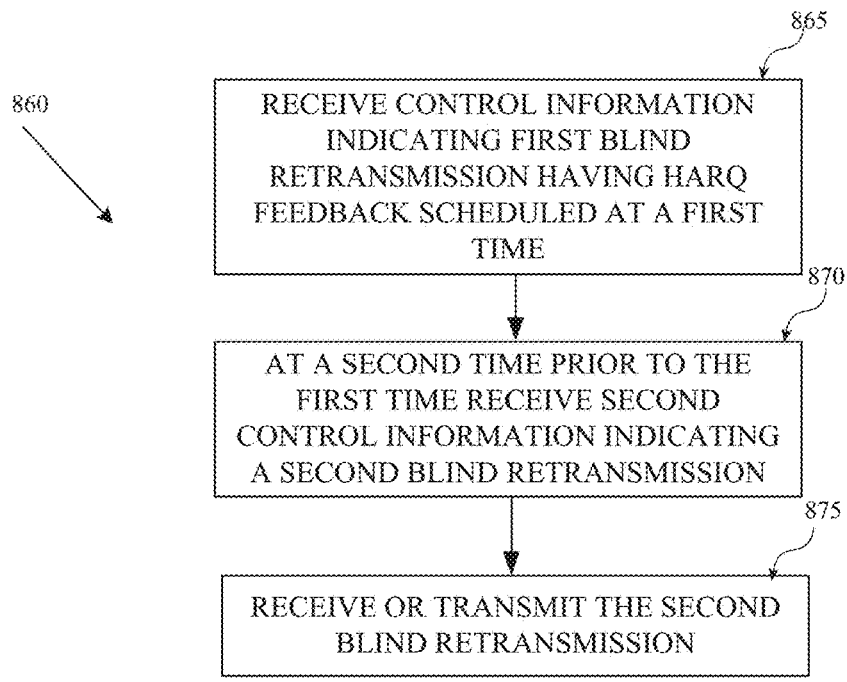
FIG. 8F is a flow diagram outlining a method for processing DCI received prior to communication of PDSCH scheduled by a prior DCI, in accordance with various aspects disclosed.

To support the use of blind retransmission, a UE may be configured to perform the exemplary method 860 of FIG. 8F. In the method, at 865, control information is received indicating a first blind retransmission having HARQ feedback scheduled at a first time. At 870, at a second time, prior to the first time, second control information is received indicating a second blind retransmission. At 875, even though the second control information is received prior to the time of the HARQ feedback for the first blind retransmission, an error event is not detected and the second blind retransmission is received.

In one example, the DL DCI includes a flag to indicate that blind retransmission is supported and, in response, the UE receiving second DCI will perform the method 860. In another example, the UE receiving second DL DCI will perform the method 860 when the time gap between the second blind transmission and the first transmission correlates to a time gap received in the first DL DCI.

When HARQ feedback is disabled, it may be advantageous to modify some configurations to compensate for lack of feedback. For example, in PDSCH configuration demodulation reference signals (DMRS) are configured for PDSCH mapping type A and PDSCH mapping type B. In PUSCH configuration or ConfiguredGrantConfig, DMRS are configured for PUSCH mapping typ A and B. DMRS configuration includes "dmrs-Type", "dmrs-AdditionalPosition", "maxLength", and so on. In on example, the configured "dmrs-AdditionalPosition" for HARQ processes with disabled feedback could be larger than configured "dmrs-AdditionalPosition" for HARQ feedback enabled. Further, other parameters, such as maxLength, which specifies a number of continuous DMRS symbols that replace each configured DMRS symbol could be differently configured for HARQ processes with disabled or enabled HARQ feedback.

Any of the above described methodologies for utilizing aggregated retransmission are well suited for use in NTN. For example, signals encoding DCI and PDSCH generated by a base station (either earthbound or on board a regenerative satellite) may be transmitted by a satellite to a UE device. Further, signals encoding PUSCH and HARQ feedback may be received by a satellite from a UE device.

Included herein are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. "Derive" should be construed to encompass computing or calculating the entity or value of the entity based on other quantities or entities. "Derive" should be construed to encompass any manner of deducing or identifying an entity or value of the entity.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Figure 9:
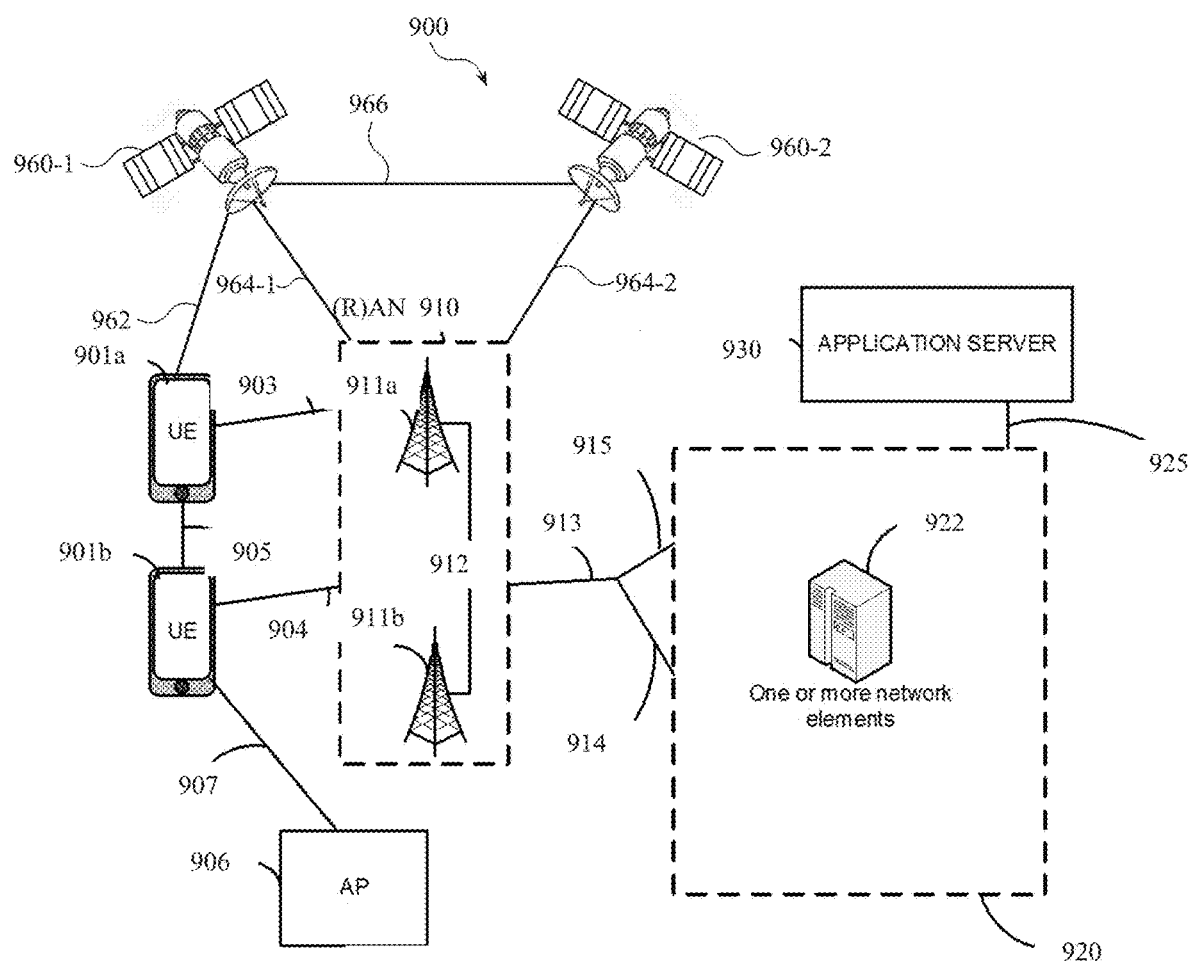
FIG. 9 illustrates an example communication network, in accordance with various aspects disclosed.

FIG. 9 illustrates an example architecture of a system 900 of a communication network, in accordance with various aspects. The following description is provided for an example system 900 that operates in conjunction with the LTE system standards and 5G or NR system standards as provided by 3GPP technical specifications. However, the example aspects are not limited in this regard and the described aspects may apply to other networks that benefit from the principles described herein, such as future 3GPP systems (e.g., Sixth Generation (6G)) systems, IEEE 702.16 protocols (e.g., WMAN, WiMAX, etc.), or the like.

As shown by FIG. 9, the system 900 includes UE 901a and UE 901b (collectively referred to as "UEs 901" or "UE 901"). In this example, UEs 901 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some aspects, any of the UEs 901 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 may be configured to connect, for example, communicatively couple, with a RAN 910. In aspects, the RAN 910 may be an NG RAN or a 5G RAN, an E-UTRAN, or a legacy RAN, such as a UTRAN or GERAN. As used herein, the term "NG RAN" or the like may refer to a RAN 910 that operates in an NR or 5G system 900, and the term "E-UTRAN" or the like may refer to a RAN 910 that operates in an LTE or 4G system 900. The UEs 901 utilize connections (or channels) 903 and 904, respectively, each of which comprises a physical communications interface or layer (discussed in further detail below).

In this example, the connections 903 and 904 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In aspects, the UEs 901 may directly exchange communication data via a ProSe interface 905. The ProSe interface 905 may alternatively be referred to as a SL interface 905 and may comprise one or more logical channels, including but not limited to a PSCCH, a PSSCH, a PSDCH, and a PSBCH.

The UE 901b is shown to be configured to access an AP 906 (also referred to as "WLAN node 906," "WLAN 906," "WLAN Termination 906," "WT 906" or the like) via connection 907. The connection 907 can comprise a local wireless connection, such as a connection consistent with any IEEE 702.11 protocol, wherein the AP 906 would comprise a wireless fidelity (Wi-Fi®) router. In this example, the AP 906 is shown to be connected to the Internet without connecting to the core network of the wireless system (described in further detail below). In various aspects, the UE 901b, RAN 910, and AP 906 may be configured to utilize LWA operation and/or LWIP operation. The LWA operation may involve the UE 901b in RRC_CONNECTED being configured by a RAN node 911a-b to utilize radio resources of LTE and WLAN. LWIP operation may involve the UE 901b using WLAN radio resources (e.g., connection 907) via IPsec protocol tunneling to authenticate and encrypt packets (e.g., IP packets) sent over the connection 907. IPsec tunneling may include encapsulating the entirety of original IP packets and adding a new packet header, thereby protecting the original header of the IP packets.

The RAN 910 can include one or more AN nodes or RAN nodes 911a and 911b (collectively referred to as "RAN nodes 911" or "RAN node 911") that enable the connections 903 and 904. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As described below, in some implementations, satellites 960 may operate as bases stations (e.g., RAN nodes 911) with respect to UEs 901. As such, references herein to a base station, RAN node 911, etc., may involve implementations where the base station, RAN node 911, etc., is a terrestrial network node and also to implementation where the base station, RAN node 911, etc., is a non-terrestrial network node (e.g., satellite 160).

As used herein, the term "NG RAN node" or the like may refer to a RAN node 911 that operates in an NR or 5G system 900 (for example, a gNB), and the term "E-UTRAN node" or the like may refer to a RAN node 911 that operates in an LTE or 4G system 900 (e.g., an eNB). According to various aspects, the RAN nodes 911 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

According to various aspects, the UEs 901 and the RAN nodes 911 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 901 and the RAN nodes 911 may operate using LAA, eLAA, and/or feLAA mechanisms. In these implementations, the UEs 901 and the RAN nodes 911 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 901 RAN nodes 911, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 702.11 technologies. WLAN employs a contention-based channel access mechanism, called CSMA/CA. Here, when a WLAN node (e.g., a mobile station (MS) such as UE 901, AP 906, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 8 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 901 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 901. The PDCCH carries information about the transport format and resource allocations related to the PDSCH channel, among other things. It may also inform the UEs 901 about the transport format, resource allocation, and HARQ information related to the uplink shared channel. Typically, downlink scheduling (assigning control and shared channel resource blocks to the UE 901b within a cell) may be performed at any of the RAN nodes 911 based on channel quality information fed back from any of the UEs 901. The downlink resource assignment information may be sent on the PDCCH used for (e.g., assigned to) each of the UEs 901.

The RAN 910 is shown to be communicatively coupled to a core network—in this aspect, core network (CN) 920. The CN 920 may comprise a plurality of network elements 922, which are configured to offer various data and telecommunications services to customers/subscribers (e.g., users of UEs 901) who are connected to the CN 920 via the RAN 910. The components of the CN 920 may be implemented in one physical node or separate physical nodes including components to read and execute instructions from a machine-readable or computer-readable medium (e.g., a non-transitory machine-readable storage medium). In some aspects, NFV may be utilized to virtualize any or all of the above-described network node functions via executable instructions stored in one or more computer-readable storage mediums (described in further detail below). A logical instantiation of the CN 920 may be referred to as a network slice, and a logical instantiation of a portion of the CN 920 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

As shown, example network 900 may include an NTN that may comprise one or more satellites 960-1 and 960-2 (collectively, "satellites 960"). Satellites 960 may be in communication with UEs 901 via service link or wireless interface 962 and/or RAN 910 via feeder links or wireless interfaces 964 (depicted individually as 964-1 and 964). In some implementations, satellite 960 may operate as a passive or transparent network relay node regarding communications between UEs 901 and the terrestrial network (e.g., RAN 910). In some implementations, satellite 960 may operate as an active or regenerative network node such that satellite 960 may operate as a base station to UEs 901 (e.g., as a gNB of RAN 910) regarding communications between UE 901 and RAN 910. In some implementations, satellites 960 may communicate with one another via a direct wireless interface (e.g., 966) or an indirect wireless interface (e.g., via RAN 910 using interfaces 964-1 and 964-2). Additionally, or alternatively, satellite 960 may include a GEO satellite, LEO satellite, or another type of satellite. Satellite 960 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 960 may operate as bases stations (e.g., RAN nodes 911) with respect to UEs 901. As such, references herein to a base station, RAN node 911, etc., may involve implementations where the base station, RAN node 911, etc., is a terrestrial network node and implementation, where the base station, RAN node 911, etc., is a non-terrestrial network node (e.g., satellite 960).

Figure 10:
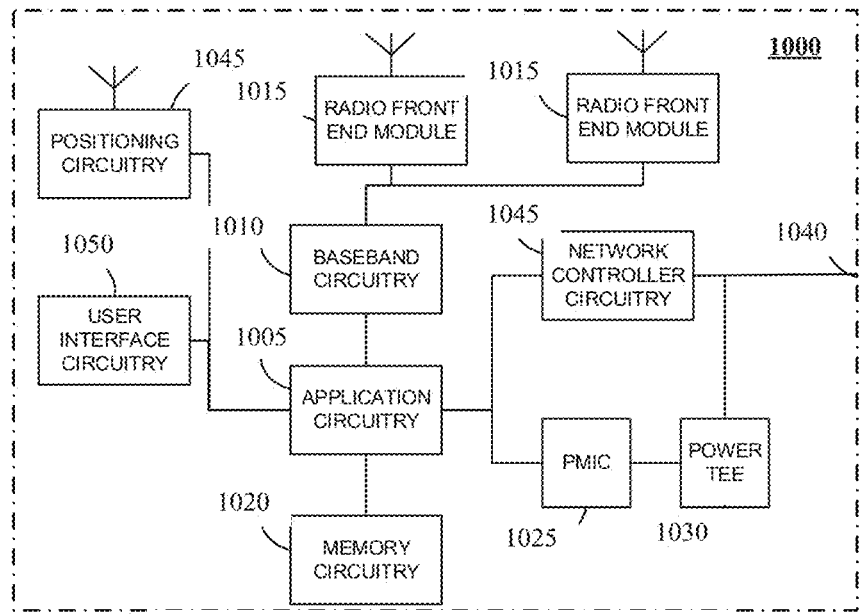
FIG. 10 illustrates an example of an infrastructure equipment device (e.g., BS, eNB, gNB), in accordance with various aspects disclosed.

FIG. 10 illustrates an example of infrastructure equipment 1000 in accordance with various aspects. The infrastructure equipment 1000 (or "system 1000") may be implemented as a base station, radio head, RAN node such as the RAN nodes 911 and/or AP 906 shown and described previously, application server(s) 930, and/or any other element/device discussed herein. In other examples, the system 1000 could be implemented in or by a UE.

The system 1000 includes application circuitry 1005, baseband circuitry 1010, one or more radio front end modules (RFEMs) 1015, memory circuitry 1020, power management integrated circuitry (PMIC) 1025, power tee circuitry 1030, network controller circuitry 1035, network interface connector 1040, satellite positioning circuitry 1045, and user interface 1050. In some aspects, the device 1000 may include additional elements such as, for example, memory/storage, display, camera, sensor, or input/output (I/O) interface. In other aspects, the components described below may be included in more than one device. For example, said circuitries may be separately included in more than one device for CRAN, vBBU, or other like implementations.

Application circuitry 1005 includes circuitry such as, but not limited to one or more processors (or processor cores), cache memory, and one or more of low drop-out voltage regulators (LDOs), interrupt controllers, serial interfaces such as SPI, 12C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some aspects, the application circuitry 1005 may comprise, or may be, a special-purpose processor/controller to operate according to the various aspects herein. As examples, the processor(s) of application circuitry 1005 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some aspects, the system 1000 may not utilize application circuitry 1005, and instead may include a special-purpose processor/controller to process IP data received from an EPC or 5GC, for example.

User interface circuitry 1050 may include one or more user interfaces designed to enable user interaction with the system 1000 or peripheral component interfaces designed to enable peripheral component interaction with the system 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 11:
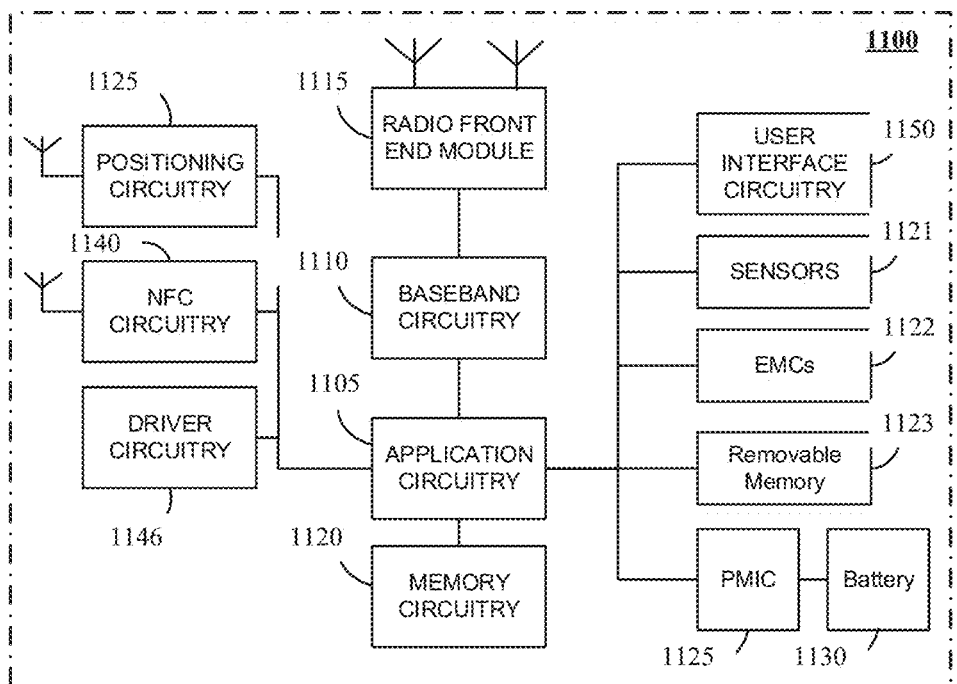
FIG. 11 illustrates an example of a user equipment device (referred to herein as a "UE" or "UE device"), in accordance with various aspects disclosed.

FIG. 11 illustrates an example of a platform 1100 (or "device 1100") in accordance with various aspects. In aspects, the computer platform 1100 may be suitable for use as UEs 901, application servers 930, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1105 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1105 may be coupled with or may include memory/storage elements and may be configured to execute instructions stored in the memory/storage to enable various applications or operating systems to run on the system 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 1105 may include a general or special purpose processor, such as an A-series processor (e.g., the A13 Bionic), available from Apple® Inc., Cupertino, Calif. or any other such processor. The processors of the application circuitry 1105 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1105 may be a part of a system on a chip (SoC) in which the application circuitry 1105 and other components are formed into a single integrated circuit, or a single package.

The baseband circuitry 1110 may be implemented, for example, as a solder-down substrate including one or more integrated circuits, a single packaged integrated circuit soldered to a main circuit board or a multi-chip module containing two or more integrated circuits.

The platform 1100 may also include interface circuitry (not shown) that is used to connect external devices with the platform 1100. The external devices connected to the platform 1100 via the interface circuitry include sensor circuitry 1121 and electro-mechanical components (EMCs) 1122, as well as removable memory devices coupled to removable memory circuitry 1123.

A battery 1130 may power the platform 1100, although in some examples the platform 1100 may be mounted deployed in a fixed location, and may have a power supply coupled to an electrical grid. The battery 1130 may be a lithium ion battery, a metal-air battery, such as a zinc-air battery, an aluminum-air battery, a lithium-air battery, and the like. In some implementations, such as in V2X applications, the battery 1130 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

EXAMPLES

Example 1 is a user equipment (UE) device, including a processor configured to perform operations including receiving control information that indicates resources for communication of a physical downlink shared channel (PDSCH) transmission and timing information for a retransmission of the PDSCH; configuring operation to receive the PDSCH transmission based on the resources; and determine that a subsequent PDSCH received at a subsequent time corresponds to the retransmission of the PDSCH when the subsequent time coincides with the indicated timing information for the retransmission and, in response combine the PDSCH with the retransmission in a HARQ buffer for decoding purposes.

Example 2 includes the subject matter of example 1, including or omitting optional elements, wherein the control information indicates a time gap between a timing of the control information and a timing of subsequent control information indicating the retransmission.

Example 3 includes the subject matter of example 1, including or omitting optional elements, wherein the control information indicates a time gap between a timing of the PDSCH and a timing of the PDSCH retransmission.

Example 4 includes the subject matter of example 1, including or omitting optional elements, wherein the control information indicates a time gap between a timing of the control information and a timing of the PDSCH retransmission.

Example 5 includes the subject matter of example 1, including or omitting optional elements, wherein the retransmission is communicated using different frequency resources than frequency resources on which the PDSCH is communicated.

Example 6 includes the subject matter of example 1, including or omitting optional elements, wherein the processor is configured to perform operations including determining, based on the control information, that HARQ feedback is disabled; and determining the timing information of the retransmission based on information in a control information field that carries information relating to HARQ feedback when HARQ feedback is enabled.

Example 7 includes the subject matter of example 1, including or omitting optional elements, wherein the control information indicates a time gap value.

Example 8 includes the subject matter of example 1, including or omitting optional elements, wherein the control information indicates a time gap index value that points to a stored value in a configured time gap table.

Example 9 includes the subject matter of example 1, including or omitting optional elements, wherein the processor is configured to perform operations including when the control information indicates that a time gap between the PDSCH and the retransmission is zero, configuring operation to complete decoding operations on the PDSCH and flush the HARQ buffer.

Example 10 includes the subject matter of example 1, including or omitting optional elements, wherein the control information indicates time and frequency resources for the retransmission.

Example 11 includes the subject matter of example 10, including or omitting optional elements, wherein the control information includes a field that carries the indication of the frequency resources.

Example 12 includes the subject matter of example 10, including or omitting optional elements, wherein the control information indicates a value that jointly encodes the time and frequency resources.

Example 13 includes the subject matter of example 1, including or omitting optional elements, wherein the control information includes timing information for more than one retransmission.

Example 14 includes the subject matter of example 1, including or omitting optional elements, wherein the control information includes a new data indicator field including two bits.

Example 15 is a method, including receiving control information that indicates resources for communication of a physical downlink shared channel (PDSCH) transmission and timing information for a retransmission of the PDSCH; configuring operation to receive the PDSCH transmission based on the resources; and determine that a subsequent PDSCH received at a subsequent time corresponds to the retransmission of the PDSCH when the subsequent time coincides with the indicated timing information for the retransmission and, in response combine the PDSCH with the retransmission in a HARQ buffer for decoding purposes.

Example 16 includes the subject matter of example 15, including or omitting optional elements, wherein the control information indicates a time gap between a timing of the control information and a timing of subsequent control information indicating the retransmission.

Example 17 includes the subject matter of example 15, including or omitting optional elements, wherein the control information indicates a time gap between a timing of the PDSCH and a timing of the PDSCH retransmission.

Example 18 includes the subject matter of example 15, including or omitting optional elements, wherein the control information indicates a time gap between a timing of the control information and a timing of the PDSCH retransmission.

Example 19 includes the subject matter of example 15, including or omitting optional elements, wherein the retransmission is communicated using different frequency resources than frequency resources on which the PDSCH is communicated.

Example 20 includes the subject matter of example 15, including or omitting optional elements, further including determining, based on the control information, that HARQ feedback is disabled; and determining the timing information of the retransmission based on information in a control information field that carries information relating to HARQ feedback when HARQ feedback is enabled.

Example 21 includes the subject matter of example 15, including or omitting optional elements, wherein the control information indicates a time gap value.

Example 22 includes the subject matter of example 15, including or omitting optional elements, wherein the control information indicates a time gap index value that points to a stored value in a configured time gap table.

Example 23 includes the subject matter of example 15, including or omitting optional elements, further including when the control information indicates that a time gap between the PDSCH and the retransmission is zero, configuring operation to complete decoding operations on the PDSCH and flush the HARQ buffer.

Example 24 includes the subject matter of example 15, including or omitting optional elements, wherein the control information indicates time and frequency resources for the retransmission.

Example 25 includes the subject matter of example 24, including or omitting optional elements, wherein the control information includes a field that carries the indication of the frequency resources.

Example 26 includes the subject matter of example 24, including or omitting optional elements, wherein the control information indicates a value that jointly encodes the time and frequency resources.

Example 27 includes the subject matter of example 15, including or omitting optional elements, wherein the control information includes timing information for more than one retransmission.

Example 28 includes the subject matter of example 15, including or omitting optional elements, wherein the control information includes a new data indicator field including two bits.

Example 29 is a base station, including a processor configured to perform operations including transmitting control information that indicates resources for communication of a physical uplink shared channel (PUSCH) transmission and timing information for a retransmission of the PUSCH; configuring operation to receive the PUSCH transmission based on the resources; and determine that a subsequent PUSCH received at a subsequent time corresponds to the retransmission of the PUSCH when the subsequent time coincides with the indicated timing information for the retransmission and, in response combine the PUSCH with the retransmission for decoding purposes.

Example 30 includes the subject matter of example 29, including or omitting optional elements, wherein the control information indicates a time gap between a timing of the control information and a timing of subsequent control information indicating the retransmission.

Example 31 includes the subject matter of example 29, including or omitting optional elements, wherein the control information indicates a time gap between a timing of the PUSCH and a timing of the PUSCH retransmission.

Example 32 includes the subject matter of example 29, including or omitting optional elements, wherein the control information indicates a time gap between a timing of the control information and a timing of the PUSCH retransmission.

Example 33 includes the subject matter of example 29, including or omitting optional elements, wherein the retransmission is communicated using different frequency resources than frequency resources on which the PUSCH is communicated.

Example 34 includes the subject matter of example 29, including or omitting optional elements, wherein the processor is configured to perform operations including indicating, in the control information, that HARQ feedback is disabled; and indicating the timing information of the retransmission in a control information field that carries information relating to HARQ feedback when HARQ feedback is enabled.

Example 35 includes the subject matter of example 29, including or omitting optional elements, wherein the control information indicates a time gap value.

Example 36 includes the subject matter of example 29, including or omitting optional elements, wherein the control information indicates a time gap index value that points to a stored value in a configured time gap table.

Example 37 includes the subject matter of example 29, including or omitting optional elements, wherein the processor is configured to perform operations including when the control information indicates that a time gap between the PUSCH and the retransmission is zero, configuring operation to complete decoding operations on the PUSCH and flush a HARQ buffer.

Example 38 includes the subject matter of example 29, including or omitting optional elements, wherein the control information indicates time and frequency resources for the retransmission.

Example 39 includes the subject matter of example 38, including or omitting optional elements, wherein the control information includes a field that carries the indication of the frequency resources.

Example 40 includes the subject matter of example 38, including or omitting optional elements, wherein the control information indicates a value that jointly encodes the time and frequency resources.

Example 41 includes the subject matter of example 29, including or omitting optional elements, wherein the control information includes timing information for more than one retransmission.

Example 42 includes the subject matter of example 29, including or omitting optional elements, wherein the control information includes a new data indicator field including two bits.

Example 43 is a method, including transmitting control information that indicates resources for communication of a physical uplink shared channel (PUSCH) transmission and timing information for a retransmission of the PUSCH; configuring operation to receive the PUSCH transmission based on the resources; and determine that a subsequent PUSCH received at a subsequent time corresponds to the retransmission of the PUSCH when the subsequent time coincides with the indicated timing information for the retransmission and, in response combine the PUSCH with the retransmission for decoding purposes.

Example 44 includes the subject matter of example 43, including or omitting optional elements, wherein the control information indicates a time gap between a time at which the PDSCH is received and a time at which the PDSCH retransmission is received.

Example 45 includes the subject matter of example 43, including or omitting optional elements, wherein the control information indicates a time gap between a timing of the PUSCH and a timing of the PUSCH retransmission.

Example 46 includes the subject matter of example 43, including or omitting optional elements, wherein the control information indicates a time gap between a timing of the control information and a timing of the PUSCH retransmission.

Example 47 includes the subject matter of example 43, including or omitting optional elements, wherein the retransmission is communicated using different frequency resources than frequency resources on which the PUSCH is communicated.

Example 48 includes the subject matter of example 43, including or omitting optional elements, further including indicating, in the control information, that HARQ feedback is disabled; and indicating the timing information of the retransmission in a control information field that carries information relating to HARQ feedback when HARQ feedback is enabled.

Example 49 includes the subject matter of example 43, including or omitting optional elements, wherein the control information indicates a time gap value.

Example 50 includes the subject matter of example 43, including or omitting optional elements, wherein the control information indicates a time gap index value that points to a stored value in a configured time gap table.

Example 51 includes the subject matter of example 43, including or omitting optional elements, further including when the control information indicates that a time gap between the PUSCH and the retransmission is zero, configuring operation to complete decoding operations on the PUSCH and flush a HARQ buffer.

Example 52 includes the subject matter of example 43, including or omitting optional elements, wherein the control information indicates time and frequency resources for the retransmission.

Example 53 includes the subject matter of example 52, including or omitting optional elements, wherein the control information includes a field that carries the indication of the frequency resources.

Example 54 includes the subject matter of example 52, including or omitting optional elements, wherein the control information indicates a value that jointly encodes the time and frequency resources.

Example 55 includes the subject matter of example 43, including or omitting optional elements, wherein the control information includes timing information for more than one retransmission.

Example 56 includes the subject matter of example 43, including or omitting optional elements, wherein the control information includes a new data indicator field including two bits.

Example 57 is a user equipment (UE) device including a processor configured to perform operations including decoding a first PDSCH received in a blind retransmission to obtain a first decoding result, wherein each blind retransmission includes control information indicating a PDSCH retransmission and a corresponding PDSCH; receiving a second PDSCH in a blind retransmission; determining a combined decoding result based on the first decoding result and the second PDSCH; determining that no subsequent blind retransmission is scheduled; and providing HARQ feedback communicating the combined decoding result, wherein the HARQ feedback includes a set of bits, each associated with at least one blind retransmission slot.

Example 58 includes the subject matter of example 57, including or omitting optional elements, wherein each bit is associated with a single blind retransmission slot and the processor is configured to perform operations corresponding to setting a bit for each blind retransmission slot based on the combined decoding result.

Example 59 includes the subject matter of example 57, including or omitting optional elements, wherein each bit is associated with a single blind retransmission slot and the processor is configured to perform operations corresponding to setting a bit for each blind retransmission slot prior to a final blind retransmission slot to indicate NACK; and setting a bit for the final blind retransmission slot based on the combined decoding result.

Example 60 includes the subject matter of example 57, including or omitting optional elements, wherein each bit is associated with a single blind retransmission slot and the processor is configured to perform operations corresponding to reducing the HARQ feedback by eliminating the bits for each blind retransmission slot prior to a final blind retransmission slot; and setting a remaining bit for the final blind retransmission slot based on the combined decoding result.

Example 61 includes the subject matter of example 57, including or omitting optional elements, wherein the HARQ feedback includes single bit associated with a final blind retransmission slot and the processor is configured to perform operations corresponding to setting the single bit based on the combined decoding result.

Example 62 includes the subject matter of example 57, including or omitting optional elements, wherein each bit is associated with a single blind retransmission slot and the processor is configured to perform operations corresponding to setting a bit for each blind retransmission slot based on a decoding result obtained based on decoding of the blind retransmission associated with the blind retransmission slot.

Example 63 is a method, including decoding a first PDSCH received in a blind retransmission to obtain a first decoding result, wherein each blind retransmission includes control information indicating a PDSCH retransmission and a corresponding PDSCH; receiving a second PDSCH in a blind retransmission; determining a combined decoding result based on the first decoding result and the second PDSCH; determining that no subsequent blind retransmission is scheduled; and providing HARQ feedback communicating the combined decoding result, wherein the HARQ feedback includes a set of bits, each associated with at least one blind retransmission slot.

Example 64 includes the subject matter of example 63, including or omitting optional elements, wherein each bit is associated with a single blind retransmission slot and the method further includes setting a bit for each blind retransmission slot based on the combined decoding result.

Example 65 includes the subject matter of example 63, including or omitting optional elements, wherein each bit is associated with a single blind retransmission and the method further includes setting a bit for each blind retransmission slot prior to a final blind retransmission slot to indicate NACK; and setting a bit for the final blind retransmission slot based on the combined decoding result.

Example 65 includes the subject matter of example 63, including or omitting optional elements, wherein each bit is associated with a single blind retransmission slot and the method further includes reducing the HARQ feedback by eliminating the bits for each blind retransmission slot prior to a final blind retransmission slot; and setting a remaining bit for the final blind retransmission slot based on the combined decoding result.

Example 66 includes the subject matter of example 63, including or omitting optional elements, wherein the HARQ feedback includes single bit associated with a final blind retransmission slot and the method further includes setting the single bit based on the combined decoding result.

Example 68 includes the subject matter of example 63, including or omitting optional elements, wherein each bit is associated with a single blind retransmission slot and the method further includes setting a bit for each blind retransmission slot based on a decoding result obtained based on decoding of the blind retransmission associated with the blind retransmission slot.

Example 69 is a base station including a processor configured to perform operations including, until HARQ-ACK feedback is received from a user equipment (UE) device, scheduling a blind retransmission for transmission to a user equipment (UE) device, wherein a blind retransmission includes control information indicating a PDSCH/PUSCH retransmission and a corresponding PDSCH/PUSCH; and transmitting the scheduled blind retransmission; and in response to receiving the HARQ-ACK feedback, refraining from scheduling further blind retransmissions.

Example 70 includes the subject matter of example 69, including or omitting optional elements, wherein the processor is configured to perform operations including determining a maximum number of blind retransmissions for scheduling based on uplink or downlink channel measurements.

Example 71 includes the subject matter of example 69, including or omitting optional elements, wherein the processor is configured to perform operations including determining a redundancy version sequence for scheduled blind retransmissions based on uplink or downlink channel measurements.

Example 72 includes the subject matter of example 69, including or omitting optional elements, wherein the processor is configured to perform operations including determining a time gap between scheduled blind retransmissions based on uplink or downlink channel measurements.

Example 71 is a method, including, until HARQ-ACK feedback is received from a user equipment (UE) device, scheduling a blind retransmission for transmission to a user equipment (UE) device, wherein a blind retransmission includes control information indicating a PDSCH/PUSCH retransmission and a corresponding PDSCH/PUSCH; and transmitting the scheduled blind retransmission; and in response to receiving the HARQ-ACK feedback, refraining from scheduling further blind retransmissions.

Example 74 includes the subject matter of example 73, including or omitting optional elements, further including determining a maximum number of blind retransmissions for scheduling based on uplink or downlink channel measurements.

Example 75 includes the subject matter of example 73, including or omitting optional elements, further including determining a redundancy version sequence for scheduled blind retransmissions based on uplink or downlink channel measurements.

Example 76 includes the subject matter of example 73, including or omitting optional elements, further including determining a time gap between scheduled blind retransmissions based on uplink or downlink channel measurements.

Example 77 is a user equipment (UE) device, including a processor configured to perform operations including receiving first control information indicating a first blind retransmission of a PUSCH scheduled at a first time; receiving, at a second time prior to the first time, second control information indicating a second blind retransmission of the PUSCH scheduled at a third time; and configuring operation to transmit the second blind retransmission of the PUSCH at the third time.

Example 78 includes the subject matter of example 77, including or omitting optional elements, wherein the processor is configured to perform operations including configuring operation to transmit the second blind retransmission of the PUSCH at the third time in response to detecting a flag in the first control information that indicates that blind retransmissions are supported.

Example 79 includes the subject matter of example 77, including or omitting optional elements, wherein the processor is configured to perform operations including configuring operation to transmit the second blind retransmission of the PUSCH at the third time in response to determining that a time gap between first blind retransmission and the second blind retransmission correlates to a time gap indicated in the first control information.

Example 80 is a method, including receiving first control information indicating a first blind retransmission of a PUSCH scheduled at a first time; receiving, at a second time prior to the first time, second control information indicating a second blind retransmission of the PUSCH scheduled at a third time; and configuring operation to transmit the second blind retransmission of the PUSCH at the third time.

Example 81 includes the subject matter of example 80, including or omitting optional elements, further including configuring operation to transmit the second blind retransmission of the PUSCH at the third time in response to detecting a flag in the first control information that indicates that blind retransmissions are supported.

Example 82 includes the subject matter of example 80, including or omitting optional elements, further including configuring operation to transmit the second blind retransmission of the PUSCH at the third time in response to determining that a time gap between first blind retransmission and the second blind retransmission correlates to a time gap indicated in the first control information.

Example 83 is a user equipment (UE) device, including a processor configured to perform operations including receiving first control information indicating a first blind retransmission of a PDSCH having HARQ feedback scheduled at a first time; receiving, at a second time prior to the first time, second control information indicating a second blind retransmission of the PDSCH scheduled at a third time; and configuring operation to receive the second blind retransmission of the PDSCH at the third time.

Example 84 includes the subject matter of example 83, including or omitting optional elements, wherein the processor is configured to perform operations including configuring operation to receive the second blind retransmission of the PDSCH at the third time in response to detecting a flag in the first control information that indicates that blind retransmissions are supported.

Example 85 includes the subject matter of example 83, including or omitting optional elements, wherein the processor is configured to perform operations including configuring operation to receive the second blind retransmission of the PDSCH at the third time in response to determining that a time gap between first blind retransmission and the second blind retransmission correlates to a time gap indicated in the first control information.

Example 86 is a method, including receiving first control information indicating a first blind retransmission of a PDSCH having HARQ feedback scheduled at a first time; receiving, at a second time prior to the first time, second control information indicating a second blind retransmission of the PDSCH scheduled at a third time; and configuring operation to receive the second blind retransmission of the PDSCH at the third time.

Example 87 includes the subject matter of example 86, including or omitting optional elements, further including configuring operation to receive the second blind retransmission of the PDSCH at the third time in response to detecting a flag in the first control information that indicates that blind retransmissions are supported.

Example 88 includes the subject matter of example 86, including or omitting optional elements, further including configuring operation to receive the second blind retransmission of the PDSCH at the third time in response to determining that a time gap between first blind retransmission and the second blind retransmission correlates to a time gap indicated in the first control information.

Example 89 is a base station including a processor configured to perform operations including determining one or more communication parameters for use in communicating with to a user equipment (UE) device based on whether HARQ feedback is enabled for the UE device.

Example 90 includes the subject matter of example 89, including or omitting optional elements, wherein the one or more communication parameters include a number and position of demodulation reference signals.

Example 91 includes the subject matter of example 89, including or omitting optional elements, wherein the one or more communication parameters include a single-symbol demodulation reference signal and a double-symbol demodulation signal.

Example 92 is a method, including determining one or more communication parameters for use in communicating with to a user equipment (UE) device based on whether HARQ feedback is enabled for the UE device.

Example 93 includes the subject matter of example 92, including or omitting optional elements, wherein the one or more communication parameters include a number and position of demodulation reference signals.

Example 94 includes the subject matter of example 92, including or omitting optional elements, wherein the one or more communication parameters include a single-symbol demodulation reference signal and a double-symbol demodulation signal.

Example 95 is a baseband processor for a user equipment (UE) device, configured to perform operations including decoding a first PDSCH received in a blind retransmission to obtain a first decoding result, wherein each blind retransmission includes control information indicating a PDSCH retransmission and a corresponding PDSCH; receiving a second PDSCH in a blind retransmission; determining a combined decoding result based on the first decoding result and the second PDSCH; determining that no subsequent blind retransmission is scheduled; and providing HARQ feedback communicating the combined decoding result, wherein the HARQ feedback includes a set of bits, each associated with at least one blind retransmission slot.

Example 96 includes the subject matter of example 95, including or omitting optional elements, wherein each bit is associated with a single blind retransmission slot and the processor is configured to perform operations corresponding to setting a bit for each blind retransmission slot based on the combined decoding result.

Example 97 includes the subject matter of example 95, including or omitting optional elements, wherein each bit is associated with a single blind retransmission slot and the processor is configured to perform operations corresponding to setting a bit for each blind retransmission slot prior to a final blind retransmission slot to indicate NACK; and setting a bit for the final blind retransmission slot based on the combined decoding result.

Example 98 includes the subject matter of example 95, including or omitting optional elements, wherein each bit is associated with a single blind retransmission slot and the processor is configured to perform operations corresponding to reducing the HARQ feedback by eliminating the bits for each blind retransmission slot prior to a final blind retransmission slot; and setting a remaining bit for the final blind retransmission slot based on the combined decoding result.

Example 99 includes the subject matter of example 95, including or omitting optional elements, wherein the HARQ feedback includes single bit associated with a final blind retransmission slot and the processor is configured to perform operations corresponding to setting the single bit based on the combined decoding result.

Example 100 includes the subject matter of example 95, including or omitting optional elements, wherein each bit is associated with a single blind retransmission slot and the processor is configured to perform operations corresponding to setting a bit for each blind retransmission slot based on a decoding result obtained based on decoding of the blind retransmission associated with the blind retransmission slot.

Example 101 is a baseband processor for a user equipment (UE) device, configured to perform operations including receiving first control information indicating a first blind retransmission of a PUSCH scheduled at a first time; receiving, at a second time prior to the first time, second control information indicating a second blind retransmission of the PUSCH scheduled at a third time; and configuring operation to transmit the second blind retransmission of the PUSCH at the third time.

Example 102 includes the subject matter of example 101, including or omitting optional elements, wherein the baseband processor is configured to perform operations including configuring operation to transmit the second blind retransmission of the PUSCH at the third time in response to detecting a flag in the first control information that indicates that blind retransmissions are supported.

Example 103 includes the subject matter of example 101, including or omitting optional elements, wherein the baseband processor is configured to perform operations including configuring operation to transmit the second blind retransmission of the PUSCH at the third time in response to determining that a time gap between first blind retransmission and the second blind retransmission correlates to a time gap indicated in the first control information.

Example 104 is a baseband processor for a user equipment (UE) device, configured to perform operations including receiving first control information indicating a first blind retransmission of a PDSCH having HARQ feedback scheduled at a first time; receiving, at a second time prior to the first time, second control information indicating a second blind retransmission of the PDSCH scheduled at a third time; and configuring operation to receive the second blind retransmission of the PDSCH at the third time.

Example 105 includes the subject matter of example 104, including or omitting optional elements, wherein the baseband processor is configured to perform operations including configuring operation to receive the second blind retransmission of the PDSCH at the third time in response to detecting a flag in the first control information that indicates that blind retransmissions are supported.

Example 106 includes the subject matter of example 104, including or omitting optional elements, wherein the baseband processor is configured to perform operations including configuring operation to receive the second blind retransmission of the PDSCH at the third time in response to determining that a time gap between first blind retransmission and the second blind retransmission correlates to a time gap indicated in the first control information.

Example 107 is a base station, including a processor configured to perform operations including transmitting first control information that indicates resources for communication of a first physical downlink shared channel (PDSCH) transmission and timing information for a retransmission of the PDSCH; configuring operation to transmit the PDSCH transmission based on the resources; and transmit second control information based on the timing information that indicates second resources for PDSCH retransmission that share the same HARQ process with the first PDSCH transmission.

Example 108 includes the subject matter of example 107, including or omitting optional elements, wherein the first control information indicates a time gap between a timing of the first control information and a timing of the second control information indicating the retransmission.

Example 109 includes the subject matter of example 107, including or omitting optional elements, wherein the first control information indicates a time gap between a timing of the PDSCH and a timing of the PDSCH retransmission.

Example 110 includes the subject matter of example 107, including or omitting optional elements, wherein the control information indicates a time gap between a timing of the first control information and a timing of the PDSCH retransmission.

Example 111 includes the subject matter of example 107, including or omitting optional elements, wherein the retransmission is communicated using different frequency resources than frequency resources on which the PDSCH is communicated.

Example 112 includes the subject matter of example 107, including or omitting optional elements, wherein the processor is configured to perform operations including indicating, in the first control information, that HARQ feedback is disabled; and indicating the timing information of the retransmission in a control information field that carries information relating to HARQ feedback when HARQ feedback is enabled.

Example 113 includes the subject matter of example 107, including or omitting optional elements, wherein the first control information indicates a time gap value.

Example 114 includes the subject matter of example 107, including or omitting optional elements, wherein the first control information indicates a time gap index value that points to a stored value in a configured time gap table.

Example 115 includes the subject matter of example 107, including or omitting optional elements, wherein the processor is configured to perform operations including when the PDSCH retransmission is a final retransmission, configure the control information to indicate that a time gap between the PDSCH and the PDSCH retransmission is zero.

Example 116 includes the subject matter of example 107, including or omitting optional elements, wherein the first control information indicates time and frequency resources for the retransmission.

Example 117 includes the subject matter of example 116, including or omitting optional elements, wherein the first control information includes a field that carries the indication of the frequency resources.

Example 118 includes the subject matter of example 116, including or omitting optional elements, wherein the first control information indicates a value that jointly encodes the time and frequency resources.

Example 1019 includes the subject matter of example 107, including or omitting optional elements, wherein the first control information includes timing information for more than one retransmission.

Example 120 includes the subject matter of example 107, including or omitting optional elements, wherein the first control information includes a new data indicator field including two bits.

Example 121 is a baseband processor for a user equipment (UE) device, including a processor configured to perform operations including receiving control information that indicates resources for communication of a physical downlink shared channel (PDSCH) transmission and timing information for a retransmission of the PDSCH; configuring operation to receive the PDSCH transmission based on the resources; and determine that a subsequent PDSCH received at a subsequent time corresponds to the retransmission of the PDSCH when the subsequent time coincides with the indicated timing information for the retransmission and, in response combine the PDSCH with the retransmission in a HARQ buffer for decoding purposes.

Example 122 includes the subject matter of example 121, including or omitting optional elements, wherein the control information indicates a time gap between a timing of the control information and a timing of subsequent control information indicating the retransmission.

Example 123 includes the subject matter of example 121, including or omitting optional elements, wherein the control information indicates a time gap between a timing of the PDSCH and a timing of the PDSCH retransmission.

Example 124 includes the subject matter of example 121, including or omitting optional elements, wherein the control information indicates a time gap between a timing of the control information and a timing of the PDSCH retransmission.

Example 125 includes the subject matter of example 121, including or omitting optional elements, wherein the retransmission is communicated using different frequency resources than frequency resources on which the PDSCH is communicated.

Example 126 includes the subject matter of example 121, including or omitting optional elements, wherein the processor is configured to perform operations including determining, based on the control information, that HARQ feedback is disabled; and determining the timing information of the retransmission based on information in a control information field that carries information relating to HARQ feedback when HARQ feedback is enabled.

Example 127 includes the subject matter of example 121, including or omitting optional elements, wherein the control information indicates a time gap value.

Example 128 includes the subject matter of example 121, including or omitting optional elements, wherein the control information indicates a time gap index value that points to a stored value in a configured time gap table.

Example 129 includes the subject matter of example 121, including or omitting optional elements, wherein the processor is configured to perform operations including when the control information indicates that a time gap between the PDSCH and the retransmission is zero, configuring operation to complete decoding operations on the PDSCH and flush the HARQ buffer.

Example 130 includes the subject matter of example 121, including or omitting optional elements, wherein the control information indicates time and frequency resources for the retransmission.

Example 131 includes the subject matter of example 130, including or omitting optional elements, wherein the control information includes a field that carries the indication of the frequency resources.

Example 132 includes the subject matter of example 130, including or omitting optional elements, wherein the control information indicates a value that jointly encodes the time and frequency resources.

Example 133 includes the subject matter of example 121, including or omitting optional elements, wherein the control information includes timing information for more than one retransmission.

Example 133 includes the subject matter of example 121, including or omitting optional elements, wherein the control information includes a new data indicator field including two bits.

Example 134 includes the subject matter of example 1, including or omitting optional elements, wherein the control information or PDSCH is transmitted by a satellite.

Example 135 includes the subject matter of example 11, including or omitting optional elements, wherein the control information is transmitted by a satellite.

Example 136 includes the subject matter of example 11, including or omitting optional elements, wherein the PUSCH is transmitted to a satellite.

Example 137 includes the subject matter of example 57, including or omitting optional elements, wherein the PDSCH is transmitted by a satellite.

Example 138 includes the subject matter of example 57, including or omitting optional elements, wherein the HARQ feedback is transmitted to a satellite.

Example 139 includes the subject matter of example 69, including or omitting optional elements, wherein the HARQ-ACK feedback is transmitted to a satellite.

Example 140 includes the subject matter of example 77, including or omitting optional elements, wherein the PUSCH is transmitted to a satellite.

Example 141 includes the subject matter of example 83, including or omitting optional elements, wherein the control information or PDSCH is transmitted by a satellite.

Example 142 includes the subject matter of example 95, including or omitting optional elements, wherein the PDCSH is transmitted by a satellite.

Example 143 includes the subject matter of example 95, including or omitting optional elements, wherein the HARQ feedback is transmitted to a satellite.

Example 144 includes the subject matter of example 101, including or omitting optional elements, wherein the PUSCH is transmitted to a satellite.

Example 145 includes the subject matter of example 104, including or omitting optional elements, wherein the control information or PDSCH is transmitted by a satellite.

Example 146 includes the subject matter of example 107, including or omitting optional elements, wherein the PDSCH is transmitted by a satellite.

Example 147 includes the subject matter of example 121, including or omitting optional elements, wherein the control information or PDSCH is transmitted by a satellite.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A user equipment (UE) comprising memory to store information and one or more processors coupled to the memory and configured to cause the UE to:

receive first control information that indicates resources for communication of a physical downlink shared channel (PDSCH) transmission and timing information for a blind retransmission of the PDSCH;

receive the PDSCH transmission based on the resources;

receive second control information that indicates resources for communication of a second PDSCH; and determine whether the second PDSCH corresponds to the blind retransmission of the PDSCH based on the timing information for the blind retransmission indicated by the first control information and, when the second PDSCH is determined to be the blind retransmission, in combine the PDSCH with the blind retransmission in a HARQ buffer for decoding purposes.

2. The UE of claim 1, wherein the first control information indicates a time gap between the first control information and the second control information.

3. The UE of claim 1, wherein the first control information indicates a time gap between the PDSCH and the blind retransmission.

4. The UE of claim 1, wherein the first control information indicates a time gap between the first control information and the blind retransmission.

5. The UE of claim 1, wherein the blind retransmission is communicated using different frequency resources than frequency resources on which the PDSCH is communicated.

6. The UE of claim 1, wherein the one or more processors are configured to perform operations comprising:
determining, based on the first control information, that HARQ feedback is disabled; and
determining the timing information of the blind retransmission based on information in a first control information field that carries information relating to HARQ feedback when HARQ feedback is enabled.

7. The UE of claim 1, wherein the first control information indicates a time gap value.

8. The UE of claim 1, wherein the first control information indicates a time gap index value that points to a stored value in a configured time gap table.

9. The UE of claim 1, wherein the one or more processors are configured to cause the UE to
when the first control information indicates that a time gap between the PDSCH and the blind retransmission is zero, configure operation to complete decoding operations on the PDSCH and flush the HARQ buffer.

10. The UE of claim 1, wherein the first control information indicates a value that jointly encodes time and frequency resources for the blind retransmission.

11. The UE of claim 1, wherein the first control information includes timing information for more than one retransmission.

12. A user equipment (UE) comprising a memory to store information and one or more processors coupled to the memory and configured to cause the UE to:
receive first control information associated with a first blind retransmission of a PDSCH, wherein the first control information indicates a first time gap between the first blind transmission and a second blind retransmission of the PDSCH;
receive and decode a first PDSCH based on the first control information to obtain a first decoding result;
receive second control information associated with the second blind retransmission of the PDSCH, wherein the second control information indicates a second time gap between the second blind retransmission and a third blind retransmission of the PDSCH;
receive and decode a second PDSCH based on the second control information;
determine a combined decoding result based on the first decoding result and the second PDSCH;
determine, based on the second control information, that no subsequent blind retransmission is scheduled; and
provide HARQ feedback communicating the combined decoding result, wherein the HARQ feedback comprises a set of bits, wherein a first bit of the set of bits is associated with the first time gap and a second bit of the set of bits is associated with the second time gap.

13. The UE of claim 12, wherein the one or more processors are configured to cause the UE to set the first bit and the second bits bit based on the combined decoding result.

14. The UE of claim 12, wherein the one or more processors are configured to cause the UE to
set the first bit to indicate NACK; and
set the second bit based on the combined decoding result.

15. The UE of claim 12, wherein the one or more processors are configured to cause the UE to
set the first bit based on the decoding of the first blind retransmission; and
set the second bit based on a decoding result obtained based on the decoding of the second blind retransmission.

16. A user equipment (UE) comprising a memory to store information and one or more processors coupled to the memory and configured to cause the UE to
receive first control information indicating a first blind retransmission of a PUSCH scheduled at a first time, the first control information also indicating a time gap;
receive, at a second time prior to the first time, second control information indicating the second blind retransmission of the PUSCH scheduled at a third time;
determine that a time gap between the first blind retransmission and the second blind retransmission correlates to the indicated time gap in the first control information; and
in response, transmit the second blind retransmission of the PUSCH at the third time.

17. The UE of claim 16, wherein the one or more processors are configured to cause the UE to
transmit the second blind retransmission of the PUSCH at the third time in response to detecting a flag in the first control information that indicates that blind retransmissions are supported.

* * * * *